(12) United States Patent
Martinov et al.

(10) Patent No.: US 11,875,110 B2
(45) Date of Patent: Jan. 16, 2024

(54) SEAMLESS ADDITION AND REMOVAL OF FORM FIELDS

(71) Applicant: salesforce.com, inc., San Francisco, CA (US)

(72) Inventors: Vladimir Martinov, Bellevue, WA (US); Charles Allen, Indianapolis, IN (US); Keld Bangsberg, Kailua-Kona, HI (US); Alison Meyer, Playa del Rey, CA (US); Patrick Tewson, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 16/778,565

(22) Filed: Jan. 31, 2020

(65) Prior Publication Data

US 2021/0240923 A1    Aug. 5, 2021

(51) Int. Cl.
   *G06F 40/186*     (2020.01)
   *G06F 3/0482*     (2013.01)
   *G06F 3/04847*    (2022.01)
   *G06Q 30/0601*    (2023.01)

(52) U.S. Cl.
   CPC .......... *G06F 40/186* (2020.01); *G06F 3/0482* (2013.01); *G06F 3/04847* (2013.01); *G05B 2219/13144* (2013.01); *G05B 2219/23261* (2013.01); *G06Q 30/0641* (2013.01)

(58) Field of Classification Search
   CPC .. G06F 40/186; G06F 3/0482; G06F 3/04847; G06Q 30/0641; G05B 2219/13144; G05B 2219/23261
   See application file for complete search history.

(56) References Cited

U.S. PATENT DOCUMENTS

| | | | | |
|---|---|---|---|---|
| 6,871,197 B1* | 3/2005 | Johnson | ................ | G06F 16/958 |
| | | | | 706/61 |
| 2007/0089053 A1* | 4/2007 | Uhlig | ................... | G06F 3/1297 |
| | | | | 715/255 |
| 2011/0302483 A1* | 12/2011 | Greenberg | ............ | G06F 40/174 |
| | | | | 715/222 |
| 2012/0166928 A1* | 6/2012 | Stern | ..................... | G06F 40/174 |
| | | | | 715/223 |
| 2015/0254780 A1* | 9/2015 | Propati | .................. | G06Q 40/00 |
| | | | | 705/4 |
| 2016/0357527 A1* | 12/2016 | Geva | ......................... | G06F 8/38 |
| 2017/0046317 A1* | 2/2017 | Geva | ..................... | G06F 40/103 |

(Continued)

FOREIGN PATENT DOCUMENTS

EP    3370141 A1 *    9/2018    ......... G06F 3/04842

*Primary Examiner* — James T Tsai
(74) *Attorney, Agent, or Firm* — Sterne, Kessler, Goldstein & Fox P.L.L.C.

(57) ABSTRACT

Provided herein are system, method, and/or computer program product embodiments, and/or combinations and sub-combinations thereof for seamlessly adding and removing form fields from a form. A form engine may receive a request to generate a form. The form engine may render a screen to populate the form with form fields and organize the form fields by sections. Form fields may be added to a selected section by toggling a button corresponding to a given form field, from unselected to selected. Form fields may be removed from any given section by toggling a button corresponding to a given form field from selected to unselected.

20 Claims, 22 Drawing Sheets

(56) References Cited

U.S. PATENT DOCUMENTS

2018/0375922 A1* 12/2018 Nemati ................... H04L 67/02
2019/0303430 A1* 10/2019 Cockerham ......... G06F 3/04817
2020/0110796 A1*  4/2020 Tsabba ..................... G06F 8/38

* cited by examiner

Gift Entry

Batches | Templates

In Progress
4 items · Sorted by Batch Name · Updated a few seconds ago

| BATCH NAME | BATCH STATUS | CREATED BY | GIFT ENTERED | RUNNING TOTAL |
|---|---|---|---|---|
| Save the Puppies Mail Campaign | Ready to Process | Stacey Gibbons | 10 of 10 | $2000.00 |
| August Major Gifts | Processing | Jason Young | 3 | $350.00 |
| Whitemail | Open | Jason Young | 5 of 7 | $1780.00 |
| July Major Gifts | Failed – Needs review | Jason Young | 8 of 8 | $3020.00 |

View All

Completed
10 items · Sorted by Batch Name · Updated a few seconds ago

| BATCH NAME | BATCH DESCRIPTION | CREATED BY | CREATED DATE | COMPLETION DATE |
|---|---|---|---|---|
| Save the Puppies Mail Campaign | | Stacey Gibbons | Oct 3, 2019 | Oct 4, 2019 |
| August Major Gifts | Name | Jason Young | Aug 31, 2019 | Aug 31, 2019 |
| Whitemail | Unsolicited gifts | Jason Young | Mar 21, 2019 | Mar 22, 2019 |
| July Major Gifts | Cows appeal | Stacey Gibbons | Mar 3, 2019 | Mar 5, 2019 |
| Feb Major Gifts | | Jason Young | Feb 19, 2019 | Feb 20, 2019 |

View All

Enter Gifts

Form Fields & Field Bundles

Choose fields to include in your form. Before adding fields, click the section in the main screen where you want the fields to go. In the sidebar, select the checkbox to add a field, and deselect it to remove the field from the form.

If the object or field you want to use isn't listed, make sure you've set up the field with Advanced Mapping. Read More...

Collapse All

▼ Field Bundles
- ☐ GAU Allocations
- ☐ Soft Credits
- ☐ Payment Scheduler
- \* ☑ Donor Type Expand All ▼ Form Fields
- ▶ Account 1
- ▶ Contact 1
- ▼ Opportunity
  - \* ☑ Donation Amount
  - \* ☑ Donation Date
  - ☐ Donation Campaign Source
  - ☐ Donation Description
  - ☐ Donation Member Level
  - ☐ Donation Name
  - ☐ Donation Stage
  - ☐ Donation Type
- ▼ Payment
  - ☑ Payment Method
  - ☐ Payment Check/Reference Number ← 508
  - 509 ☑ Check Date ← 504
  - 505 ☐ Deposit Date
  - ☐ Payment Instructions Expand All ▶ Advanced Form Fields

For more advanced gift entry forms, select fields from the following objects.
- ▶ Account 2

Configure Form Fields

Click a section, then select a field in the side bar to add it to the section in the main screen. For each field, you can edit the field label, mark it as required, assign a default value or remove it from the section. The gift entry form layout can be managed by creating sections and reordering the sections or fields.

Gift Entry Form  ⚙ < >  ← 402

| Field Label ⓘ | Required | Default Value |
|---|---|---|
| \* Donor Type ⓘ | | |
| Donor Type | ☑ | ▼ |
| \* Account: Account ⓘ | | |
| Account: Account | ☑ | Search 🔍 |
| \*Contact: Contact ⓘ | | |
| Contact: Contact | ☑ | Search 🔍 |
| \*Opportunity: Donation Amount ⓘ | | |
| Opportunity: Donation Amount | ☑ | |
| \*Opportunity: Donation Date ⓘ | | |
| Opportunity: Donation Date | ☑ | |
| Payment: Payment Date ⓘ | | |
| Payment: Payment Date | ☐ | |

Section  ⚙ < >  ← 403 / 500

| Field Label ⓘ | Required | Default Value |
|---|---|---|
| Payment: Check Date | | |
| Payment: Check Date | ☐ | |

Add Section

Form Fields & Field Bundles

Choose fields to include in your form. Before adding fields, click the section in the main screen where you want the fields to go. In the sidebar, select the checkbox to add a field, and deselect it to remove the field from the form.

If the object or field you want to use isn't listed, make sure you've set up the field with Advanced Mapping. Read More...

Collapse All

▼ Field Bundles
  ☐ GAU Allocations
  ☐ Soft Credits
  ☐ Payment Scheduler
  * ☑ Donor Type ▼ Form Fields                                Expand All
  ▶ Account 1
  ▶ Contact 1
  ▼ Opportunity
    * ☑ Donation Amount
    * ☑ Donation Date
    ☐ Donation Campaign Source
    ☐ Donation Description
    ☐ Donation Member Level
    ☐ Donation Name
    ☐ Donation Stage
    ☐ Donation Type
  ▼ Payment                                  508
    ☑ Payment Method
    509 ☑ Payment Check/Reference Number
    ☑ Check Date
    ☐ Deposit Date
    ☐ Payment Instructions
  ▶ Advanced Form Fields                     Expand All For more advanced gift entry forms, select fields from the following objects.
  ▶ Account 2
  ▶ Contact 2
  ▶ Address

Configure Form Fields

Click a section, then select a field in the side bar to add it to the section in the main screen. For each field, you can edit the field label, mark it as required, assign a default value or remove it from the section. The gift entry form layout can be managed by creating sections and reordering the sections or fields.

Gift Entry Form                                          ⚙ ◁ ▷  ← 402

| Field Label ⓘ | Required | Default Value | |
|---|---|---|---|
| * Donor Type ⓘ | | | |
| Donor Type | ☑ | ▼ | 🗑 ▷ |
| * Account: Account ⓘ | | | |
| Account: Account | ☑ | Search 🔍 | 🗑 ◁ ▷ |
| *Contact: Contact ⓘ | | | |
| Contact: Contact | ☑ | Search 🔍 | 🗑 ◁ ▷ |
| *Opportunity: Donation Amount ⓘ | | | |
| Opportunity: Donation Amount | ☑ | 🔢 | 🗑 ◁ ▷ |
| *Opportunity: Donation Date ⓘ | | | |
| Opportunity: Donation Date | ☑ | 🔢 | 🗑 ◁ ▷ |
| Payment: Payment Date ⓘ | | | |
| Payment: Payment Date | ☐ | | 🗑 ◁ ▷ |

Section                                                  ⚙ ◁ ▷  ← 502, 500

| Field Label ⓘ | Required | Default Value | |
|---|---|---|---|
| Payment: Check Date ⓘ | | | |
| Payment: Check Date | ☐ | 🔢 | 🗑 ◁ ▷ |
| Payment: Payment Check/Reference Num... ⓘ | | | |
| Payment: Payment Check/Referen... | ☐ | | 🗑 ◁ ▷ |

Add Section ← 506

Select Batch Header Fields
Choose fields to include in your Batch Header. Select the checkbox to add a field and deselect to remove the field from the form. If you'd like additional custom fields available for the Batch Header, add them in the NSP Data Import Batch object.

1008
* ☑ Batch Name ←1006
1010 ☐ Batch Owner
☑ Description
☐ Deposit Location
☑ Expected Count of Gifts
☑ Expected Total Batch Amount
☑ Require Expected Totals Match
☐ Batch Number ⓘ
☐ Distribution Dates
☐ Batch Category

}1004

Configure Batch Header Fields
For each field, you can edit the field label, mark it as required, or assign a default value. Please note: default values can be overwritten by the person who creates the batch.

Field Label ⓘ                  Required   Default Value

* Batch Name
  [Batch Name]                    ☑        [                ] 🗑 < >

Description
  [Description]                   ☐        [                ] 🗑 < >

Expected Count of Gifts
  [Expected Count of Gifts]       ☐        [                ] 🗑 < >

Expected Total Batch Amount
  [Expected Total Batch Amount]   ☐        [                ] 🗑 < >

Require Expected Totals Match
  [Require Expected Totals Match] ☐        [                ] 🗑 < >

Set Default Values

Set a default value for this batch. You can override the default value when you enter a gift.

Gift Entry Form

Default Value

- Donor Type [▸]
- Account 1: Account [Search...] 🔍
- Contact 1: Contact [Search...] 🔍
- Opportunity Donation Amount
- Opportunity Donation Date [▦]
- Payment: Payment Date [▦]

Check Information

Default Value

- Payment: Check Date
- Payment: Payment Check/Reference Num... [▦]

GAU Allocations

This section contains fields that cannot have default values.

[Back] 1208

○ ─── ⊘ ─── ⊘
      1206

[Cancel] [Save] 1204

Batch Gift Entry
November 2019 Checks —1314

New Gift

∨ Gift Entry Form

Donor Type — *Account — *Contact

Select... ▸ | Search... 🔍 | Search... 🔍

*Donation Date — Payment Method

▦ | Select... ▸

∨ Check Information

Check Date — Payment Check/Reference Number

▦ |

∨ GAU Allocations

General Accounting Unit — Amount — Percent

01 – Unrestricted Funds 🔍 | $0.00 | 100%

Add New Allocation $0.00 remaining

1310— [ Cancel & Clear Form ] [ Save & Enter New Gift ] —1308

Looks like you haven't entered any gifts yet!
Enter a new gift and it will appear here.

[ Batch Dry Run ] [ Process Batch ] [ Edit ]
1316 — 1318 — 1320

*Donation Amount

—1302

—1306

All Gifts
Gifts Entered — Total Count: 0
Total Amount:

All Gifts
Gifts Entered
Total Amount: $100.00

Total Count: 1

| Donor ↓ | ∨ Donation Amount | ∨ Donation Date | Payment Method | ∨ Check Date | ∨ Payment Chec... | ∨ General Acc... |
|---|---|---|---|---|---|---|
| Rachel Morris | $100.00 ←1800 | Nov 20, 2019 | Check | Nov 15, 2019 | 78549 | 01 – Unrestrict... ▶ |

SEAMLESS ADDITION AND REMOVAL OF FORM FIELDS

BACKGROUND

Users often use form generating applications to generate forms including various form fields. The user may want to organize the form fields on the form in a given manner. However, when using conventional form generating applications organizing the form fields may be an error-prone and cumbersome process. This may cause unnecessary inaccuracies and delays when creating forms.

BRIEF DESCRIPTION OF THE DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

FIG. 2 illustrates a batches screen according to an example embodiment.

FIG. 5 illustrates a new section included in the form according to an example embodiment.

FIG. 6 illustrates the form field screen according to an example embodiment.

FIG. 7 illustrates the form field screen according to an example embodiment.

FIG. 10 illustrates a batch header screen according to an example embodiment.

FIG. 12 illustrates a select default values screen according to an example embodiment.

FIG. 13 illustrates a forms screen according to an example embodiment.

FIG. 14 illustrates a section of the form according to an example embodiment.

FIG. 17 illustrates the GAU allocation section according to an example embodiment.

FIG. 18 illustrates a summary section according to an example embodiment.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof for seamless addition and removal of form fields.

As described above, users may use form generating applications for generating forms including form fields. The user may desire to include form fields of a given type based on the information the form is being used to collect. Furthermore, the user may desire to organize the form fields in the form in a given manner. However, when using conventional form generating applications, organizing form fields in a form may be a cumbersome and error-prone process. For example, form generating applications may require a user to drag and drop a form field in a form in a desired section of the form. This can cause the user to inaccurately place a form field in an incorrect section of the form.

In an embodiment, a selection of a section of a form may be received by a form engine. The form engine may render a visual indicator around the section, the visual indicator may indicate that the section is selected. The form engine may receive a selection of a pre-generated form field. The form engine may determine that the section is selected and add the pre-generated form field to the section of the form. The pre-generated form field may be configured to receive a particular type of data. As a non-limiting example, the pre-generated form field may be configured to receive an account holder's name. The pre-generated form field may be mapped to a given database column in a data repository.

The form field is selected by actuating a button corresponding to the form field to cause it to toggle from unselected to selected. The form engine may generate the new section of the form in response to receiving a request to generate the new section. The form engine may remove the visual indicator from the section of the form and render it around the new section of the form, indicating that the new section is now selected.

The form engine may receive a request to remove the form field from the section in response to the actuation of the button corresponding to the form field, causing the button to toggle from selected to unselected. Subsequently, the form engine may receive a selection of the same form field in response to the actuation of the button corresponding to the form field. This causes the button to toggle from unselected to selected. The form engine may determine that the new section is now selected and may add the form field to the new section, based on the new section being selected.

This configuration allows the seamless addition and removal of form fields when creating the form. This way, a user may accurately and efficiently organize the form fields on the form.

Figure 1:
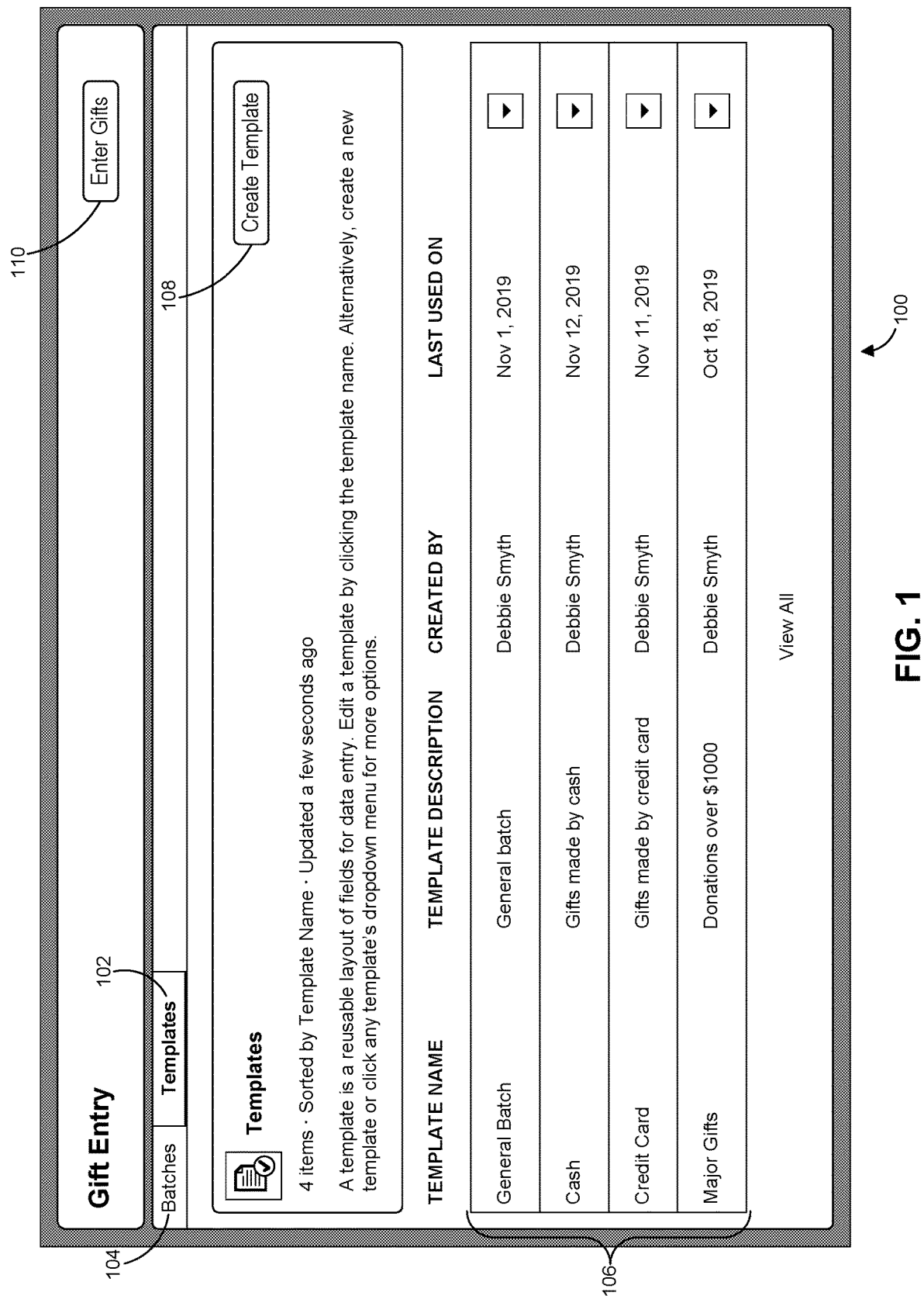
FIG. 1 illustrates a templates screen for generating a form according to an example embodiment.

FIG. 1 illustrates a templates screen 100 for generating a form according to an example embodiment. The initial screen may include a templates tab 102 and a batches tab 104. The templates screen 100 may be rendered in response to the selection of the templates tab 102 may include a list of possible templates 106 to choose from. The templates may be form templates that were previously generated by a user. The list of possible templates 106 may include information such as template name, template description, user the template was created by, and a date the template was last used. The template name may be a link, which, when actuated, may navigate the templates screen 100 to the selected template. The templates screen 100 may include a create new template button 108, which may be selected to create a new form template. The templates screen 100 may also include an enter information button 110. The enter information button 110 may launch a pop-up from which a user can select a form template for entering information.

FIG. 2 illustrates a batches screen 200 according to an example embodiment. The batches screen 200 may include the templates tab 102 and the batches tab 104. The batches screen 200 may be rendered in response to selecting the batches tab 104. The batches screen 200 may further include a list of in-progress batches 202 and a list of completed batches 204.

Batches may be multiple instances of forms to be processed at the same time. For example, an entity may be managing donations provided to various charities or campaigns. Each charity or campaign may have a set of donations to be entered using a particular form. Each donation may be entered in a separate instance of a form. The list of in-progress batches 202 may be batches for which each donation of the set of donations has not yet been entered, or the batch has not yet been processed. When a batch is processed, the information about each donation entered in each form is committed to the respective data repositories and any necessary action is executed. The list of the completed batches 204 may include batches for which each donation of the set of donations has been entered and processed.

The list of in-progress batches 202 may indicate a batch name, batch status, created by, gifts entered (e.g., donations), and a running total (total donations). The batch status may be ready to process, processing, open, or failed-needs review. The gifts entered may indicate the amount of donations.

The list of completed batches 204 may indicate a batch name, batch description, created by, created date, and completion date.

The batch names in both the list of in-progress batches 202 and the list of completed batches 204 may be links to the batches themselves. A user can navigate to a selected batch by actuating the link embedded in the batch name.

The batches screen 200 may also include the enter information button 110.

Figure 3:
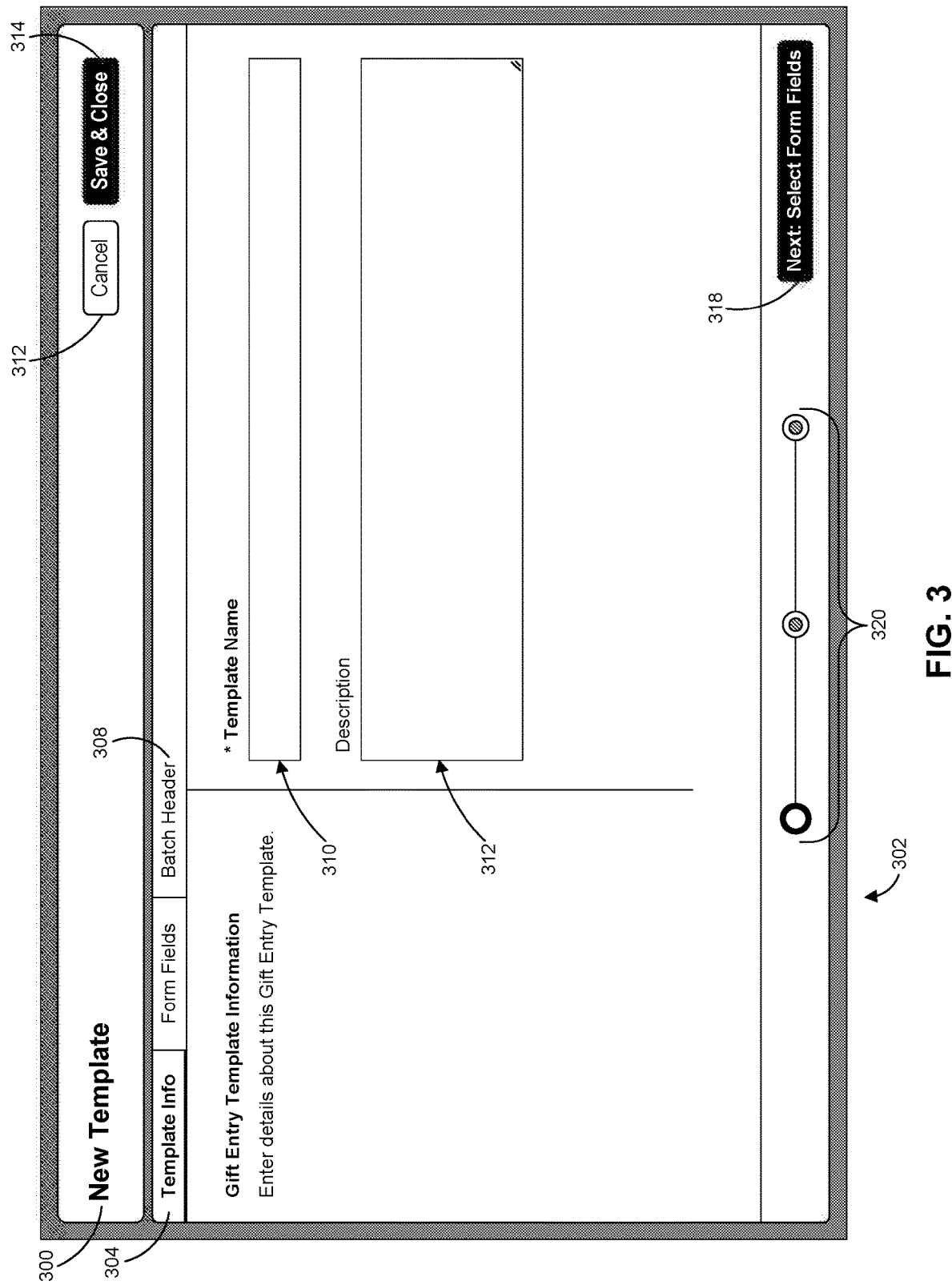
FIG. 3 illustrates a template info screen embedded in a new template screen according to an example embodiment.

FIG. 3 illustrates a template info screen 302 embedded in a new template screen according to an example embodiment. As shown in FIG. 1, the templates screen may include a create new template button. In receiving a selection of the create new template button the new template screen 300 may be rendered. The new template screen 300 may include template info tab 304, form fields tab 306, and a batch header tab 308. In response to the selection of the template info tab 304, the templates info screen 302 may be generated. The templates info screen 302 may be embedded in the new template screen 300. As an example, the templates info screen 302 may be a frame window within the new template screen 300. The new template screen 300 may be used to generate a new form. A user may toggle between the templates info tab 304, the form fields tab 306, and batch header tab 308 to enter the appropriate information for generating a form. The new templates screen 300 may include a save & close button 314 and cancel button 316. The save & close button 314 may be selected to save the current settings of the form and to close out of the new template screen 300. The cancel button 312 may be selected to cancel any changes to the form to be generated and to close out of the new templates screen 300.

The template info screen 302 may include a template name field 310 and a description field 312. The template name 312 may be a mandatory field which may be the name for the form. The description field 312 may be a description of the form to be generated.

The new template screen 300 may also include a footer at the bottom of the screen. The footer may include a progress bar 320 and a button to progress to the next screen or the previous screen. The screens may correspond with the templates info tab 304, the form fields tab 306, and batch header tab 308. Since the templates info screen is being rendered, the progress bar 320 may indicate that this is the first step in generating the form. Furthermore, the templates info screen 302 may include a next: select form fields button 318 to progress to the form fields screen.

Figure 4:
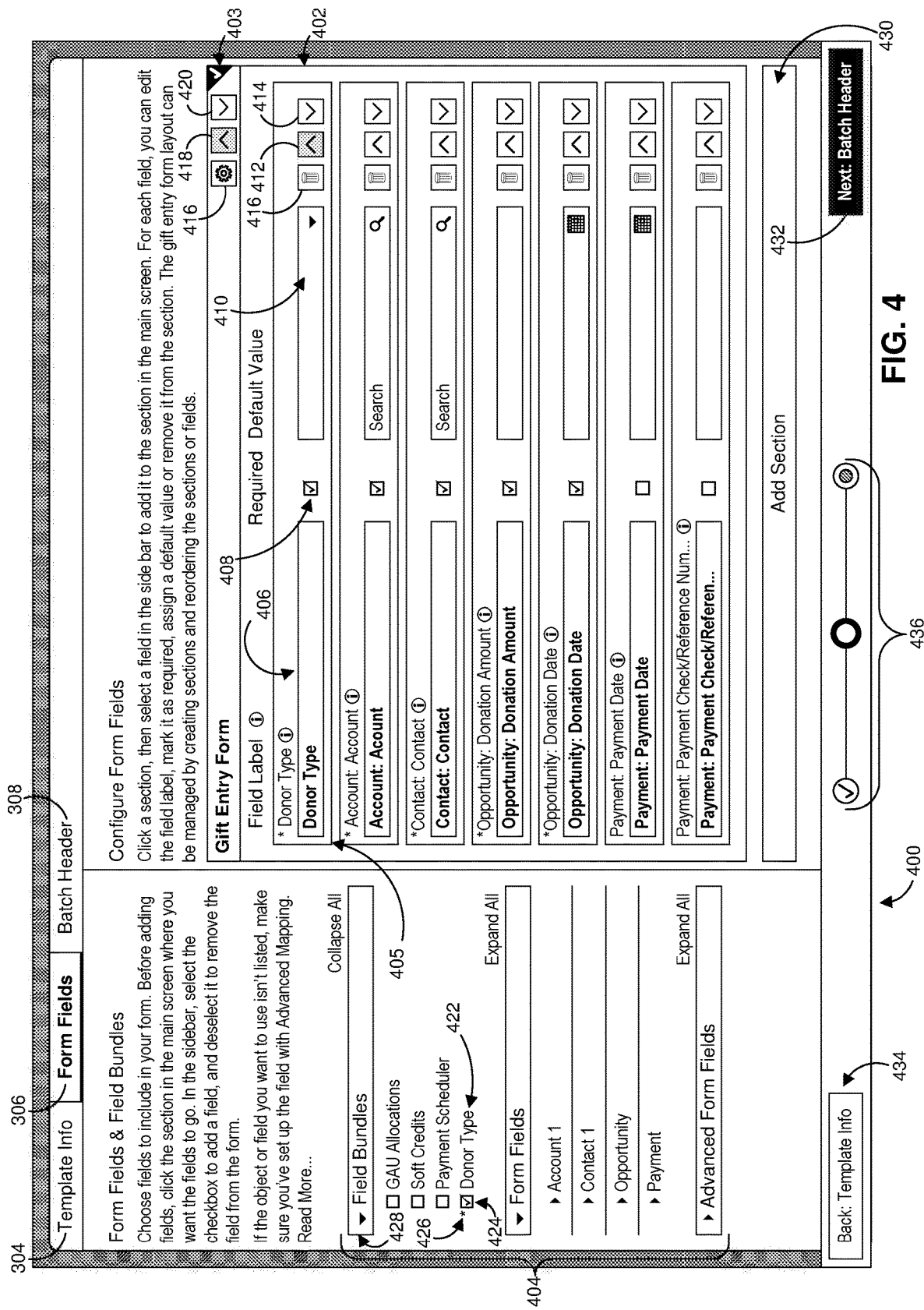
FIG. 4 illustrates a form fields screen according to an example embodiment.

FIG. 4 illustrates a form fields screen 400 according to an example embodiment. The form fields screen 400 may be rendered in response to selecting the form fields button or selecting the form fields tab, as shown in FIG. 3. The form fields screen 400 may include a templates info tab 304, the form fields tab 306, and the batch header tab 308. A user may navigate to the templates info screen by selecting the templates info tab 304. A user may navigate to the batch header screen by selecting the batch header tab 308.

The form fields screen 400 may be used to populate a form with sections and form fields. The form fields may be pre-generated to receive a particular type of input and correspond to a particular type of data type. For example, a form field may be account name. The form field may accept alphanumeric text and may map to a database column corresponding to the account name.

The form fields screen 400 may include a section 402 of a form and a list of form fields 404. The list of form fields 404 may be organized based on categories 428. For example, the categories may include field bundles, form fields, account 1, contact 1, opportunity, payment, and advanced fields. Each category may be expanded and collapsed to view or hide a selection of form fields 422 corresponding to the category 428. The selection of form fields 422 may be used to select and unselect form fields to be added in the form. The selection of form fields 422 may include the name of the form field and a button 424 such as a checkbox. The selection of form fields 422 may also include an asterisk 426 next to a selection of the form field to indicate that, that particular form field is required in the form. For example, the donor type form field may be required in the form. The selection of form fields 422 may be selected to be added in the section by actuating the button 424 such that the button is toggled from unselected to selected. For example, the checkbox may be toggled from unchecked to checked.

Section 402 may include a visual indicator 403 surrounding the border of the section. The visual indicator 403 may indicate that the section is currently selected. A form field may be added to section 402 by actuating the button 424 such that the button is toggled from unselected to selected, while the visual indicator is rendered surrounding the border of section 402. In other words, a form field may be added to section 402 by checking an unchecked checkbox corresponding to a selection of a form field 422, while section 402 is selected. As an example, the checkbox for donor type may be checked while section 402 may be selected resulting in the donor type form field to be added to section 402.

The form field 405 added to section 402 may include a field label 406, a required button 408, and a default value

410. The field label 406 may be the name (or label) of the form field 405. The required button 408 may be a checkbox indicating whether the user wants to make the form field 405 mandatory while completing the form. The default value 410 may be an input field for the form field 405. The input field may receive a default value for the form field. The default value may be rendered when the form is being completed. The input field may of a type corresponding to the form field. For example, the input box may be a dropdown menu, text input box, date input box, or the like.

The form field 405 may also include an up arrow button 412, a down arrow button 414, and a delete button 416. The selection of the up arrow button 412 may move the form field 405 above the preceding form field in the section. The selection of the down arrow button 414 may move the form field 405 below the subsequent form field in the section. If the form field may not be moved up, the up arrow button 412 may be greyed out. If the form field may not be moved down, the down button 412 may be greyed out. The selection of the delete button 416 may delete the form field 405 from section 402. In response to the selection of the delete button 416, the checkbox corresponding to the selection of the form field 422 for the form field 405, may be toggled to unchecked.

The section 402 may include a settings button 416, an up arrow button 418, and a down arrow button 420. Selection of the settings button 416 may launch a pop-up for editing the settings (e.g., name and other feature) of section 402. The selection of the up arrow button 418 may move section 402 above the preceding section. Selection of the down arrow button 420 may move section 402 below the subsequent section. If section 402 may not be moved up, the up arrow button 418 may be greyed out. If section 402 may not be moved down, the down button 420 may be greyed out.

The form fields screen 402 may include an add section button 430. The selection of the add section button 430 may add a new section to the form. The new section may be positioned below the section 402.

The form fields screen 400 may include footer including a next: batch header button 432, a back: template info button 434, and a progress bar 436. The next: batch header button 432 may be selected to proceed to the batch header screen. The back: template info button 434 may be to go back to the templates info screen 400. The progress bar 436 may indicate that the templates info screen 300 has been filled out and the user is currently on the form field screen 400.

Figure 5:
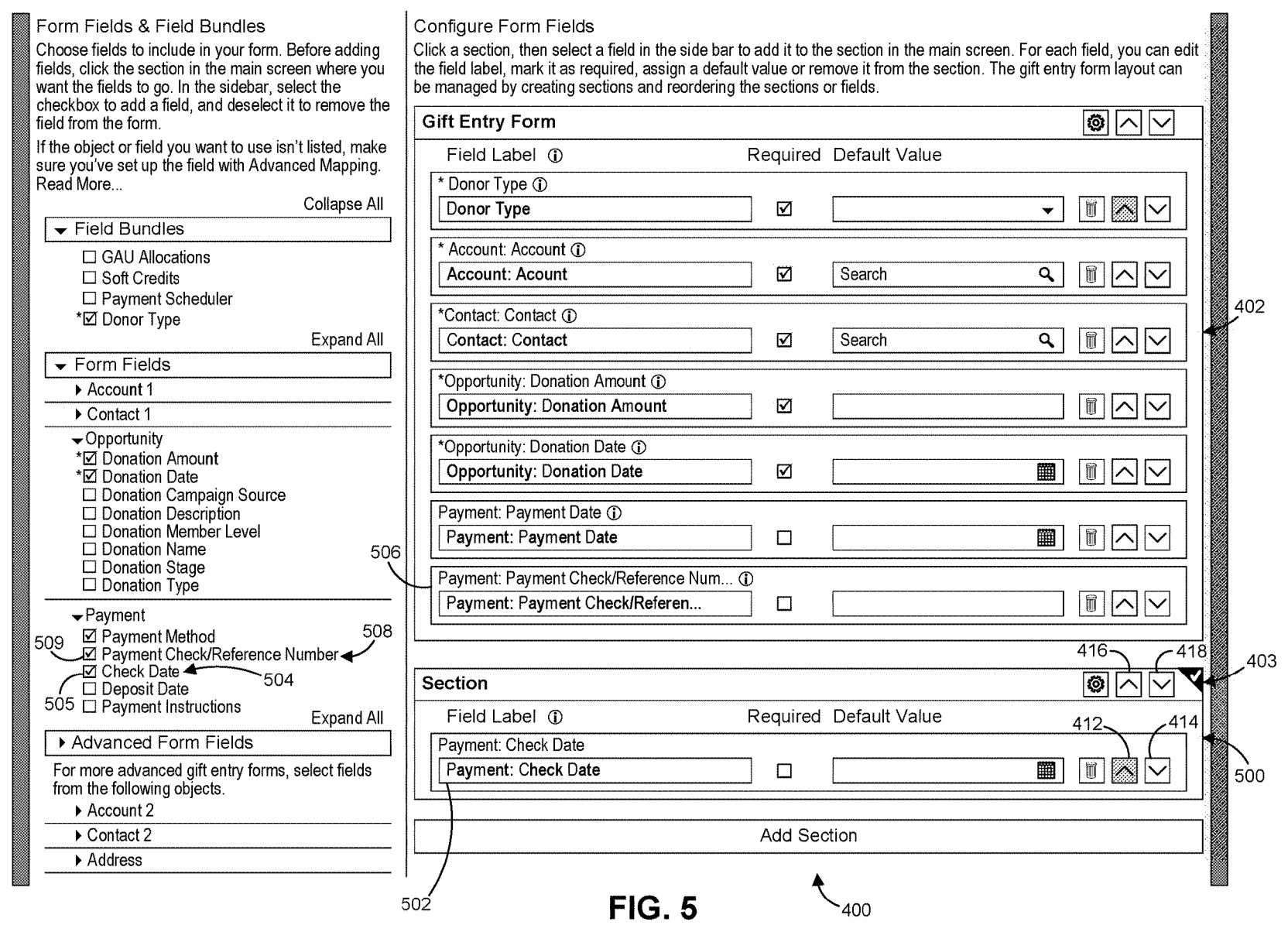

FIG. 5 illustrates a new section 500 included in the form according to an example embodiment. The visual indicator 403 may be rendered around the new section 500, indicating that the new section 500 is selected. The new section may include a form field 502 which may correspond to a selection of the form field 504. The button 505 corresponding to the selection of the form field 504 may be toggled to selected.

The section 402 may include form field 506 which corresponds with a selection of the form field 508. The button 509 corresponding to the selection of the form field 508 may be toggled to selected.

The new section 500 may include an up arrow button 416 and a down arrow button 418. The up arrow button 416 may be selected to move the new section 500 above section 400. The form field 502 may include an up arrow button 412 and a down arrow button 414. The up arrow button 412 may be greyed out as the form field 502 is the first form field of the new section 500. The down arrow button 502 may move the form field below the subsequent form field.

FIG. 6 illustrates the form field screen 400 after actuation of the button 509 corresponding to the selection of the form field 508, to toggle the button 509 from selected to un-selected. The form field corresponding to the selection of the form field 509 may be removed from section 402 (e.g., form field 506 as shown in FIG. 5). The visual indicator 403 may remain around the new section 500, indicating that new section 500 remains selected, while the button 509 is toggled from selected to un-selected and the form field is removed from section 402.

FIG. 7 illustrates the form field screen 400 after actuation of the button 509 corresponding to the selection of the form field 508, to toggle the button 509 from unselected to selected. The form field 506 may be added to the new section 500. The visual indicator 403 may remain around the new section 500, indicating that new section 500 remains selected, while the button 509 is toggled from unselected to selected and the form field is added to the new section 500.

With reference to FIGS. 5-7, the form field 506 was removed from section 402 and added to the new section 500 by toggling the button 509 to first unselect the selection of the form field 506, and then toggled again to add the form field 506 to the new section 500. This is all executed while the new section 500 remains selected.

Figure 8:
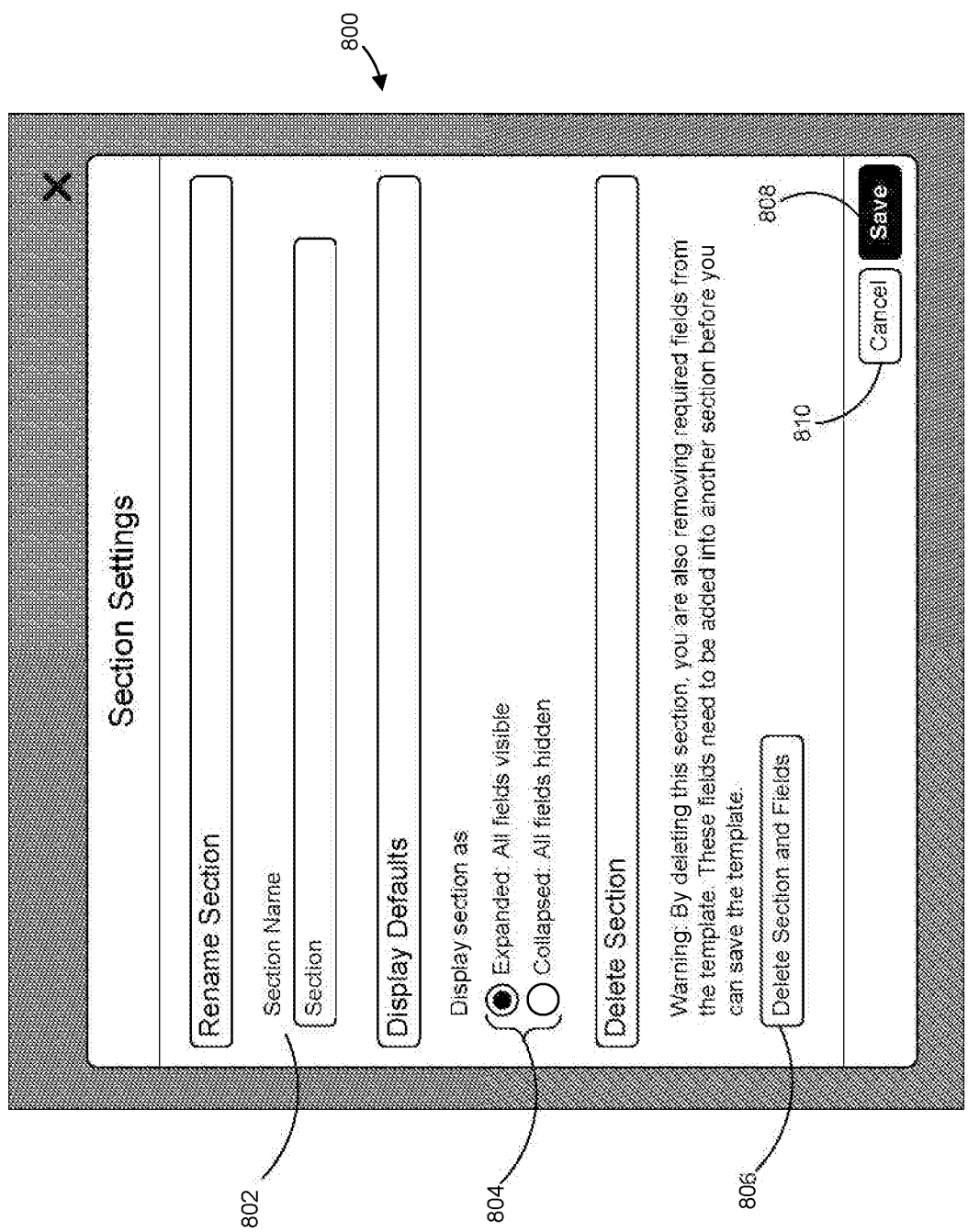
FIG. 8 illustrates a section settings screen according to an example embodiment.

FIG. 8 illustrates a section settings screen 800 according to an example embodiment. The section settings screen 800 may be rendered in response to selecting the settings button as shown in FIG. 4. The section settings screen 800 may include a section name field 802, display defaults selection 804, and a delete section and fields button 808. The section name field 802 may be an input box for receiving a section name (e.g., alphanumeric text). The display defaults section 804 may include selections for viewing the form fields in an expanded or collapsed view. The delete section may include a delete section and fields button 808. Selecting the delete section and fields button 806 may delete the section and corresponding fields. The section settings screen 800 may also include a save button 808 and a cancel button 810. The save button 808 may be selected to save the section settings button 808 and the cancel button 810 may be selected to cancel out of the section settings screen 800 without saving the section settings.

Figure 9:
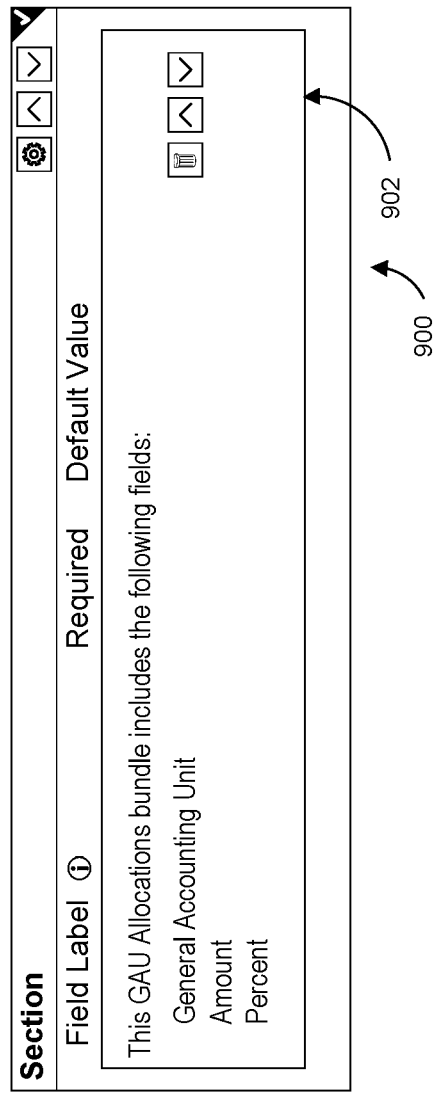
FIG. 9 illustrates a section included in a form according to an example embodiment.

FIG. 9 illustrates a section 900 included in a form that may not be modifiable according to an example embodiment. That is, the form field 902 may not accept a default value, the order of the form field may not be modifiable, the field label may not be modifiable, or the like.

FIG. 10 illustrates a batch header 1000 screen according to an example embodiment. Once a user has completed adding and formatting the form fields for generating the form, the user may proceed to the batch header screen 1000. The batch header screen 1100 may be rendered in response to selecting the next: batch header button as shown in FIG. 4 (next: batch header button 432) or by selecting the batch header tab as shown in FIGS. 3 and 4 (batch header tab 308). The batch header screen 1000 may be used to generate fields for a batch corresponding to the form that is to be generated. For example, a batch may be used to contain similar types of gifts for a given charity. The form may be for providing donation information for each donation received for the given charity.

The batch header screen 1000 may include batch header fields 1002 and a list of batch header field selections 1004. The list of batch header field selections 1004 may include selections of batch header fields 1006. Each selection of batch header field may correspond with a button 1008 which may be toggled between selected and unselected. The button 1008 may be toggled to selected to add the batch field 1002 corresponding to the selection of the batch field 1006. An asterisk 1010 may be rendered adjacent to a selection of batch fields which are required batch fields.

The batch fields 1002 may be added so that the batch information is provided prior to completing the form. In this example, the batch fields may include batch name, description, expected count of gifts, expected total batch amount, and require expected total to match. This information may be provided prior to filling out a given form. The batch may require multiple instances of the form to be completed. Each instance of the batch may correspond with the batch information that is provided based on the batch field 1002.

Figure 11:
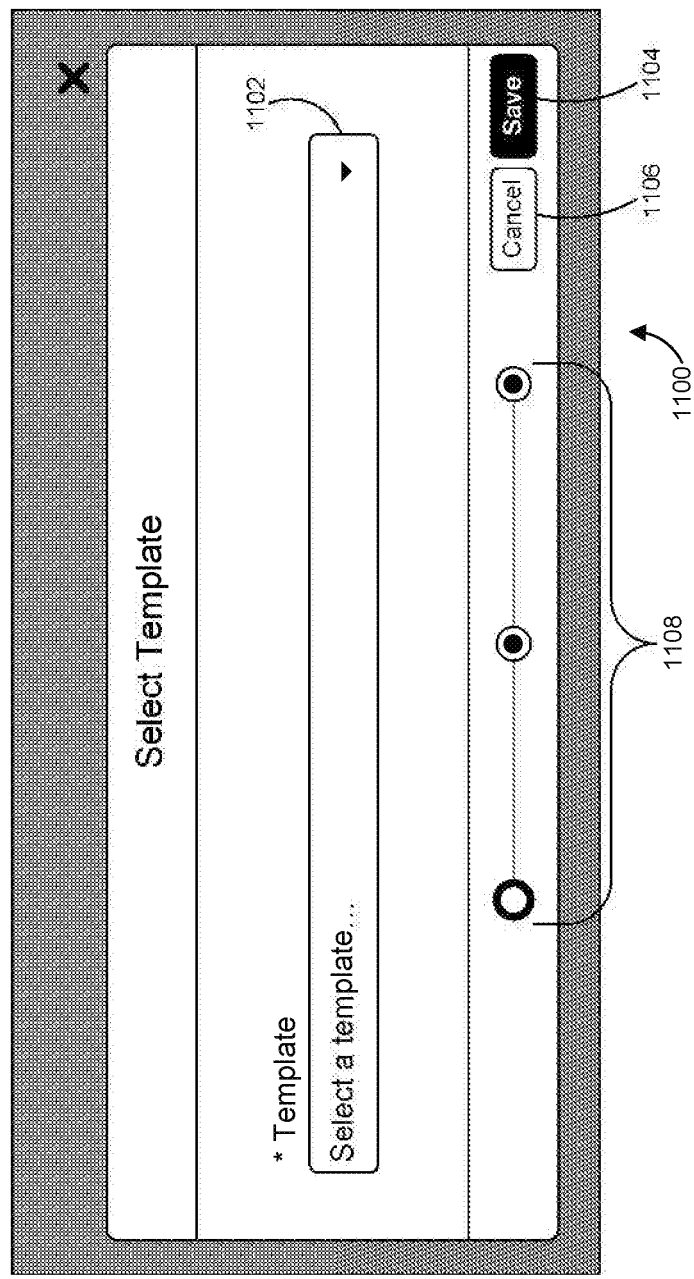
FIG. 11 illustrates a template selection screen according to an example embodiment.

FIG. 11 illustrates a template selection screen 1100 according to an example embodiment. The template selection screen 1100 may be used to select a template of a generated form. The template selection screen 1100 may be rendered in response to the selection of the enter information button on the templates info screen as shown in FIG. 2. The templates selection screen 1100 may include a dropdown menu 1102. A template for a generated form may be elected from the dropdown menu 1102.

The template selection screen 1100 may also include a next button 1104 and a cancel button 1106. In response to the selection of the next button 1104, a user may progress to filling out instances of the selected form. The template selection screen 1100 may also include a progress bar 1108. The progress bar 1108 may indicate that that the user is at the template selection screen 1100.

FIG. 12 illustrates a select default values screen 1200 according to an example embodiment. The select default values 1200 screen may include the form fields 1202 of the form selected in the templates selection screen as shown in FIG. 12. Input boxes may be rendered adjacent to the form fields 1202. The input boxes may receive default values for the form fields 1202. The default values may be included as default values for the form fields on the form when filling out each instance of the form.

The select default values screen 1200 may include a save button 1204, a cancel button 1205, and a back button 1208. In response to the selection of the save button 1204 may save the default values input for the user for the form fields and proceed to the selected form. In response to the selection of the cancel button 1205, a user may cancel out of the save default values screen 1200. In response to the selection of the back button 1208, the user may navigate back to the template selection screen as shown in FIG. 11. The select default values screen 1200 may also include the progress bar 1108. The progress bar 1108 may indicate a user is on the select default values screen 1200.

FIG. 13 illustrates a forms screen 1300 according to an example embodiment. The forms screen 1300 may include the selected form 1302. The selected form 1302 may include sections 1306 that were included in the form when building the form. The selected form 1302 may also include form fields 1304 under each respective section 1306 as selected when building the form. The form fields 1304 and sections 1306 may be in the order as selected when building the form.

A user may input values for the form fields 1304. The user must provide values for the form fields 1304 that are mandatory. The user may or may not provide values for the form fields 1304 that are not mandatory.

The forms screen 1300 may also include a save and enter new form button 1308 and cancel and clear form button 1310. The save and enter form button 1308 may save the values for the form fields provided by the user. A new instance of the form may be rendered on the form screen 1300. In response to the selection of the cancel and clear form button, the values provided by the user may be discarded and the form fields may be cleared.

The forms screen 1300 may include a summary section 1312. The summary section 1312 may include a summary of each instance of the form that has been saved.

The forms screen 1300 may include a process dry run button 1316, a process batch button 1318, and edit button 1320. In response to the selection of the process dry run button 1316 possible errors in the saved instances of the form may be identified. In response to the selection of the process batch 1318, the values provided in each instance of the form may be committed to the respective data repository and any necessary action may be executed. In response to the selection of the edit button 1320, the form or batch may be edited.

Figure 14:
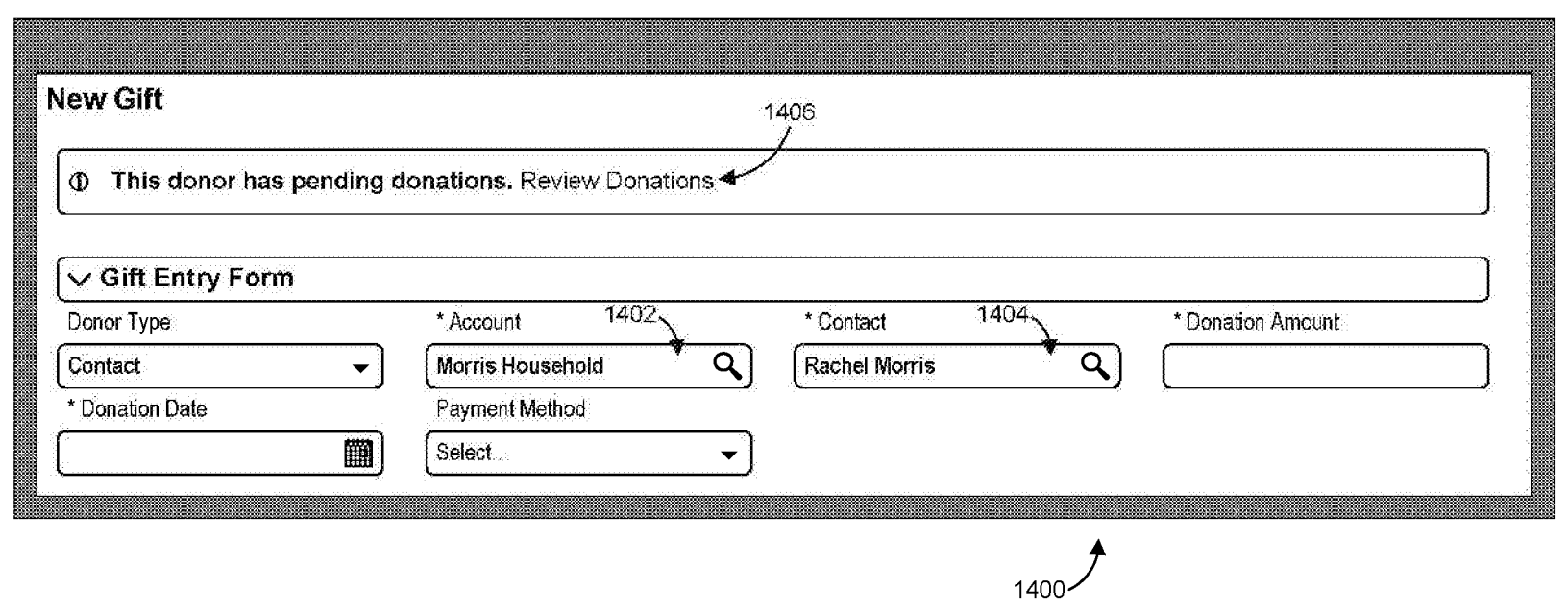

FIG. 14 illustrates a section 1400 of the form according to an example embodiment. As a non-limiting example, the form may be used to enter donations for a charity. Each instance of the form may correspond with a donation. The section 1400 may include an account form field 1402 and a contact form field 1404. The account form field 1402 may receive the account name of the person/entity making the donation.

The section 1400 may include a link 1406 for previous donations. The link 1406 may be rendered in response to entering the account name in the account form field 1402. The link may be actuated to navigate to the previous donations pledged or made by the person/entity making the donation.

Figure 15:
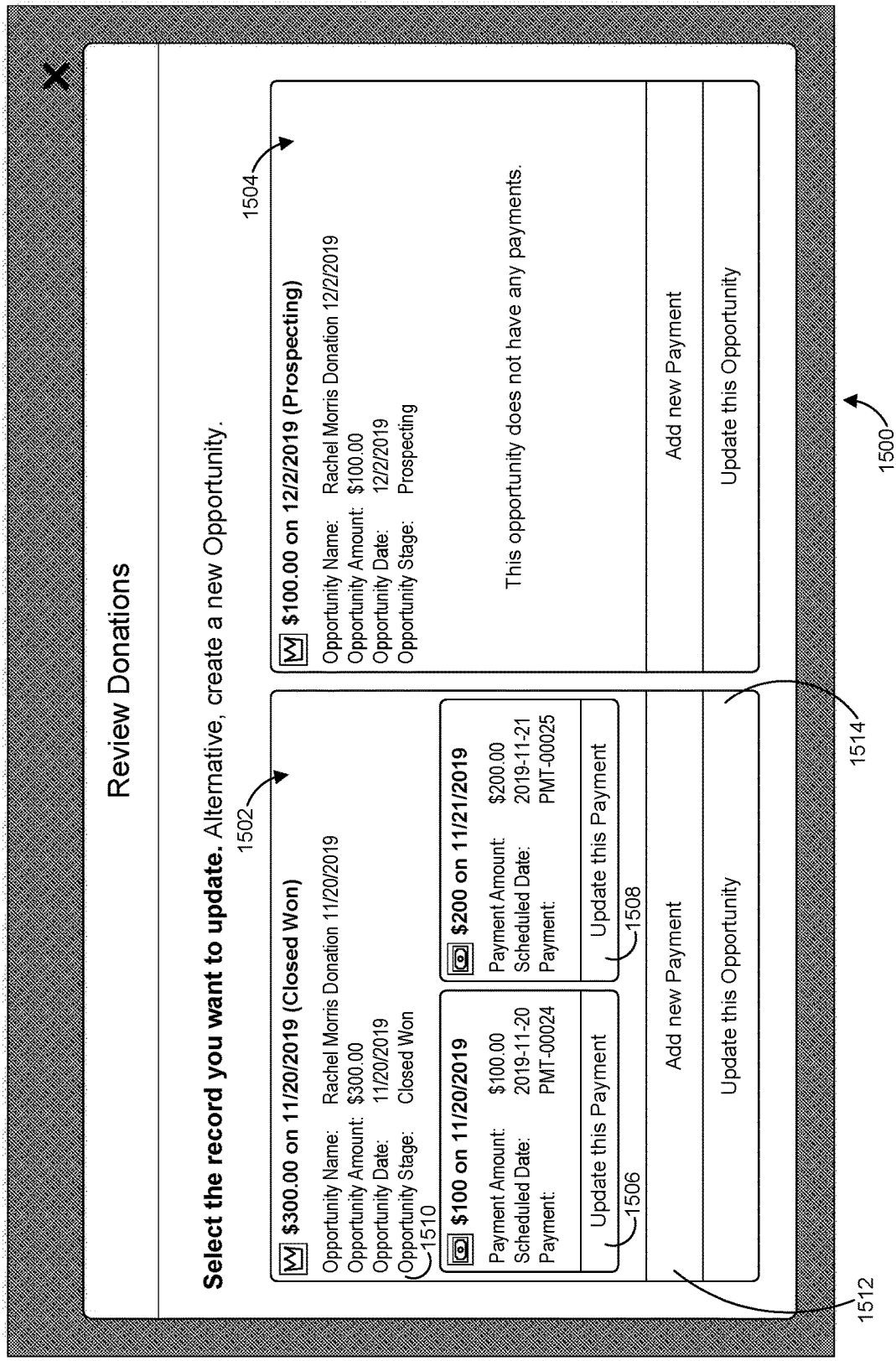
FIG. 15 illustrates a previously pledged donations screen according to an example embodiment.

FIG. 15 illustrates a previous donations screen 1500 according to an example embodiment. The previous donations screen 1500 may be rendered in response to selecting the link to previous donations shown in FIG. 14. The previous donations screen 1500 may indicate unpaid-pledged donations made by a person/entity. The previous donations screen 1500 may include closed donations section 1502. The closed donations section 1502 may include a closed donation 1510. The closed donation section 1502 may include information about the closed donation such as the amount of the donation and other information about the donation such as donation status, date, account name, or the like. A closed donation corresponds with a donation that corresponds with a signed pledged agreement even if it has not yet been paid. The previous donations screen 1500 may include a prospecting donation section 1504. The prospecting donation section 1504 may include a prospecting donation that may be selected as an expected donation from the person/entity to indicate that the form being filled out corresponds with the prospecting donation. A prospecting donation may be at an earlier stage of donation solicitation (for example a pledge agreement has not yet been signed). In response to the selection of the prospecting donation, the amount of the prospecting donation may be automatically populated in the form.

The closed donations section 1502 may also include pledged donations 1506 and 1508. The pledged donations 1506 and 1508 may be donations that the person/entity had pledged but the donation had not been received. A user may be filling out a form directed to a pledged donation. In this regard, pledged donation 1506 or 1508 may be selected to indicate that the form being filled out corresponds with one of these pledged donations. In response to the selection of the pledged donation, the amount of the pledged donation may be automatically populated in the form.

The closed donation section 1502 and prospecting donation section 1504 may include an add a new payment button 1512 and update this opportunity button 1514. The add a new payment button 1512 may be selected to add a new payment that is not listed in the closed donation section 1502 and prospecting donation section 1504. The update this opportunity section may be selected to update information about the account holder and their previous donations.

Figure 16:
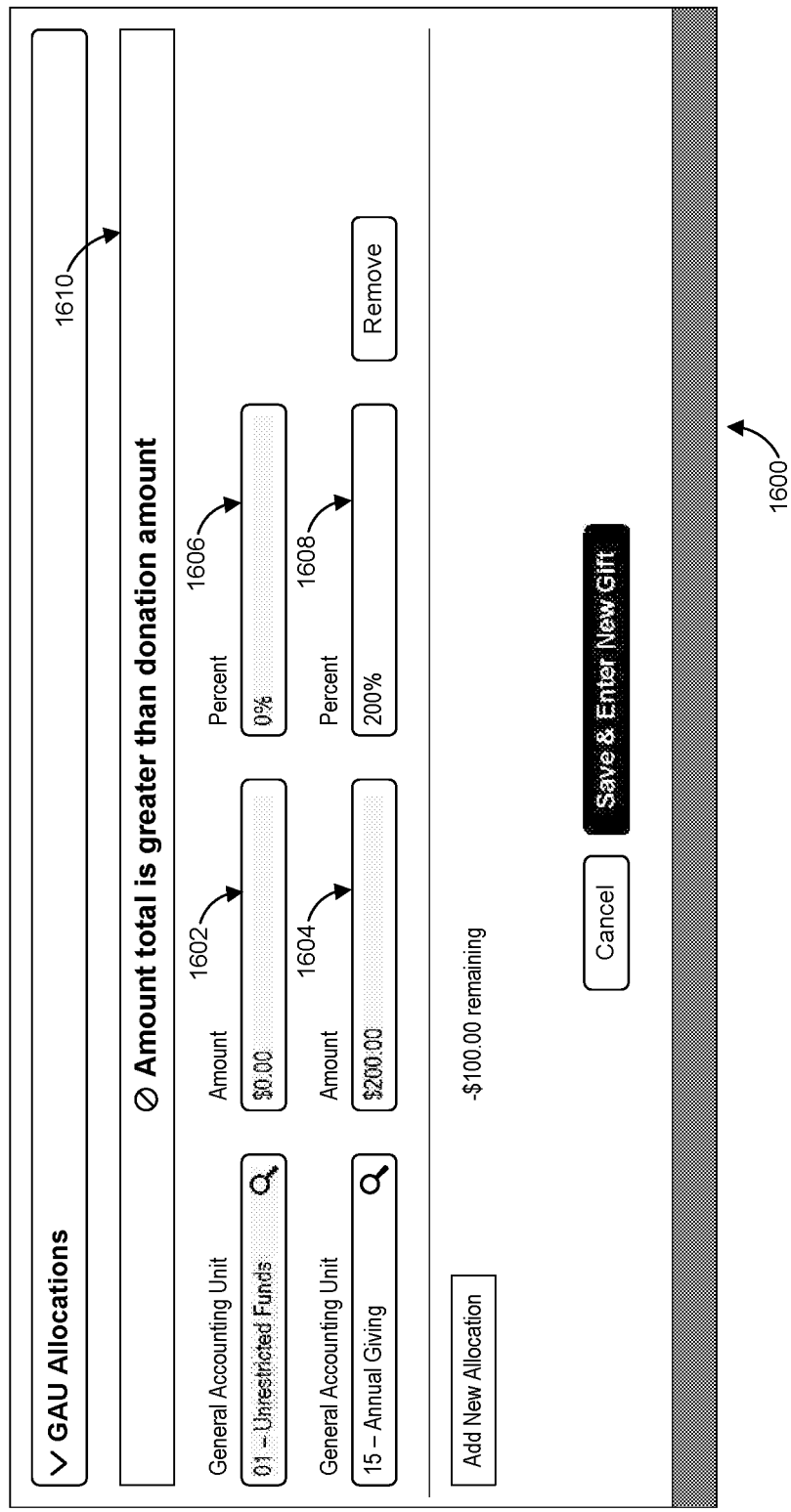
FIG. 16 illustrates a GAU allocation section according to an example embodiment.

FIG. 16 illustrates a GAU allocation section 1600 according to an example embodiment. The GAU allocation section 1600 may be included in forms that receive inputs for donations to a charity. The GAU allocation section 1600 may include form fields for allocating the donation amount based on categories.

In the example shown in FIG. 16, the categories may be unrestricted funds and annual giving. Form field 1602 may correspond with an amount value from the donation allocated for the unrestricted funds category. Form field 1604 may correspond with an amount value from the donation allocated for the annual giving category. Form field 1606 may correspond with a percentage from the donation allocated to the unrestricted funds category. Form field 1608 may correspond with a percentage from the donation allocated to the annual giving category. The values received for form field 1602 may be tied to form field 1606, and vice versa. The values received for form field 1604 may be tied to form field 1608, and vice versa. For example, in the event, the total donation amount is $100. If the amount value provided for form field 1602 is $50, form field 1606 may automatically be populated with the percentage of 50% (since $50 is 50% of $100). Similarly, if the amount value provided for form field 1604 is $50, form field 1608 may automatically be populated with the percentage of 50%. Alternatively, if the percentage of 50% is provided to form fields 1606 and 1608, 50% of $100 may be automatically populated in form fields 1602 and 1604.

In the example shown in FIG. 16, the total donation amount may be $100. A user may provide 200% as a percentage on form field 1608. Form field 1604 may be automatically populated with $200 which is 200% of $100 dollars. However, since $200 is more than the total donation amount an error message $100 may be rendered above the GAU allocation section 1600.

Figure 17:
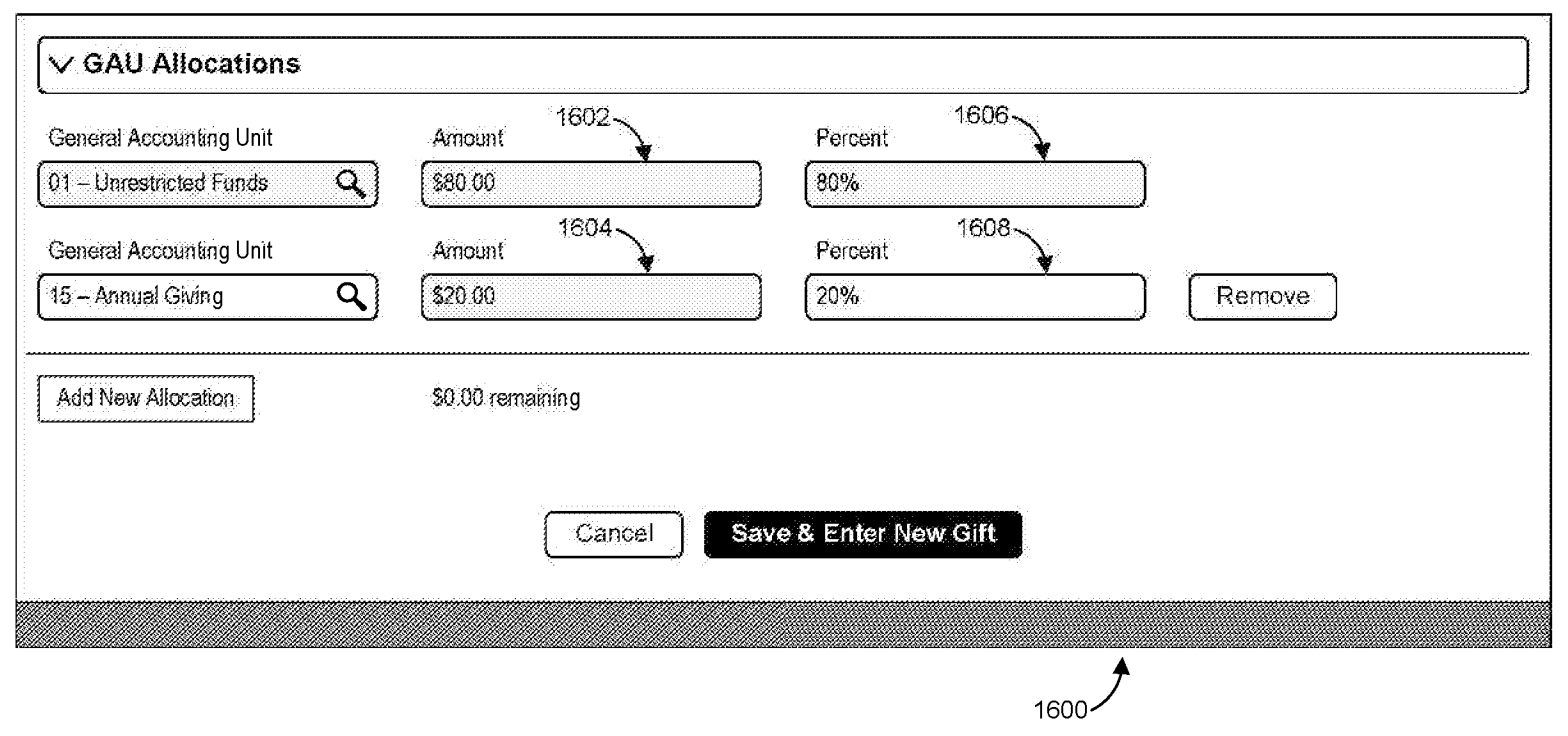

FIG. 17 illustrates the GAU allocation section 1600 according to an example embodiment. Continuing with the example shown in FIG. 16, a user may provide an amount value of $80.00 in form field 1602. A percentage value of 80% may be automatically populated in the form field 1606. The user may provide an amount value of $20.00 in form field 1604. A percentage value of 20% may be automatically populated in form field 1608. Alternatively, a user may provide a percentage value of 80% for form field 1606. The form field 1602 may be automatically populated with an amount value of $80 (80% of $100). A user may provide a percentage value of 20% in the form field 1608. The form field 1604 may be automatically populated with $20 (20% of $100).

In an embodiment, form fields 1602, 1604, 1606, and 1608 may be tied to each other. For example, in the event, a user provides $80.00 in form field 1602. A percentage value of 80% may be automatically populated in the form field 1606. Furthermore, form field 1604 may be automatically populated with $20 (the remainder of the donation). Form field 1608 may be automatically populated with 20%.

In another example, the user may provide an amount value of $20.00 in form field 1604. A percentage value of 20% may be automatically populated in form field 1608. Form field 1602 may be automatically populated with $80 (remainder of the donation). Form field 1608 may be automatically populated with 80%.

FIG. 18 illustrates a summary section 1312 according to an example embodiment. The summary section may include a summary 1800 about an instance of a form that has been submitted. In the example shown in FIG. 18, the submitted form may correspond with donation information. The summary 1800 may include donor name, donation amount, donation date, payment method, check date, payment check reference, and amount allocation information.

Figure 19:
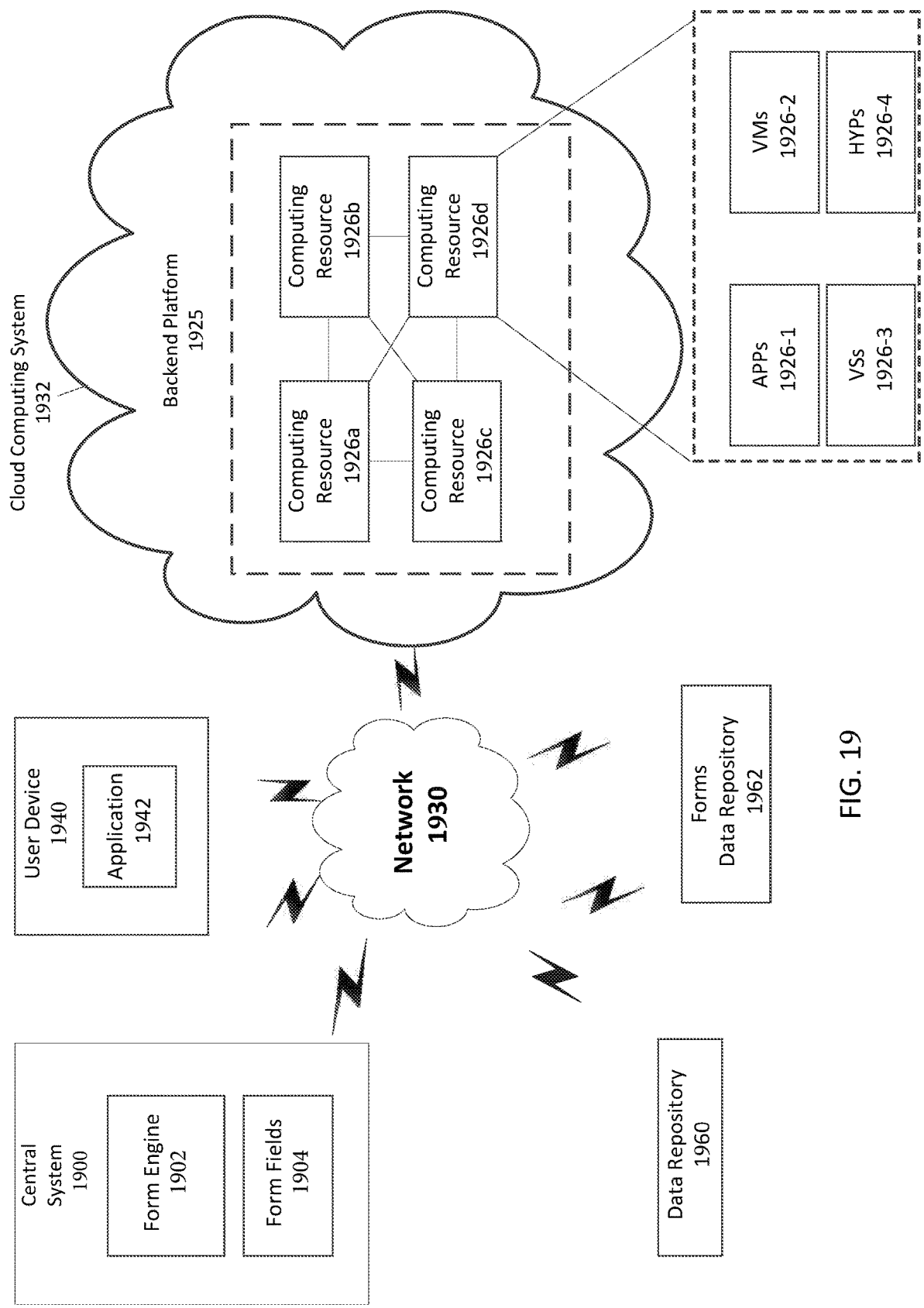
FIG. 19 is a block diagram of an example environment in which systems and/or methods described herein may be implemented according to an example embodiment.

FIG. 19 is a block diagram of an example environment in which systems and/or methods described herein may be implemented. The environment may include a central system 1900, a user device 1940, data repository 1960, a forms data repository 1962, a cloud computing environment 1932, and a network 1930. The devices of the environment may be connected through wired connections, wireless connections, or a combination of wired and wireless connections.

In an example embodiment, one or more portions of the network 1930 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The backend platform 1925 may include one or more devices configured to host applications such as application 1942. The backend platform 1925 may include a server or a group of servers. In an embodiment, the backend platform 1925 may be hosted in a cloud computing environment 1932. It may be appreciated that the backend platform 1925 may not be cloud-based, or may be partially cloud-based.

The central system 1900, the data repository 1960, and the forms data repository 1962 may include one or more devices configured to interface with the backend platform 1925. In an embodiment, the user device 1940 may execute application 1942. The application 1942 may interface with the central system 1940 to generate, fill out, and process forms. The central system 1900, data repository 1960, and forms data repository 1962 may reside fully or partially in the cloud computing system 1932. Alternatively, central system 1900, data repository 1960, forms data repository 1962 may reside outside the cloud computing system 1932.

In an embodiment, the data repository 1960 may be configured to store data received from the central system 1900 or application 1942, which was input in a form. In an embodiment, the data repository 1960 may reside in a client-side environment.

The forms data repository 1962 may store generated forms (or form templates). The forms may be retrieved for filling out and submitting using the application 1942.

The cloud computing environment 1932 includes an environment that delivers computing as a service, whereby shared resources, services, etc. may be provided to the user device 1940 and/or the backend platform 1925. The cloud computing environment 1932 may provide computation, software, data access, storage, and/or other services that do not require end-user knowledge of a physical location and configuration of a system and/or a device that delivers the services. The cloud computing system 1932 may include computing resources 1926*a-d*.

Each computing resource 1926*a-d* includes one or more personal computers, workstations, computers, server devices, or other types of computation and/or communication devices. The computing resource(s) 1926*a-d* may host the backend platform 1925. The cloud resources may include compute instances executing in the computing resources 1926a-d. The computing resources 1926a-d may communicate with other computing resources 1926a-d via wired connections, wireless connections, or a combination of wired or wireless connections.

Computing resources 1926a-d may include a group of cloud resources, such as one or more applications ("APPs") 1926-1, one or more virtual machines ("VMs") 1926-2, virtualized storage ("VS") 1926-3, and one or more hypervisors ("HYPs") 1926-4.

Application 1926-1 may include one or more software applications that may be provided to or accessed by user device 1940. In an embodiment, the application 1942 may be executed locally on the user device 1940. Alternatively, the application 1926-1 may eliminate a need to install and execute software applications on the user device 1940. The application 1926-1 may include software associated with backend platform 1925 and/or any other software configured to be provided across the cloud computing environment 1932. The application 1926-1 may send/receive information from one or more other applications 1926-1, via the virtual machine 1926-2.

Virtual machine 1926-2 may include a software implementation of a machine (e.g., a computer) that executes programs like a physical machine. Virtual machine 1926-2 may be either a system virtual machine or a process virtual machine, depending upon the use and degree of correspondence to any real machine by virtual machine 1926-2. A system virtual machine may provide a complete system platform that supports the execution of a complete operating system (OS). A process virtual machine may execute a single program and may support a single process. The virtual machine 1926-2 may execute on behalf of a user and/or on behalf of one or more other backend platforms 1925, and may manage the infrastructure of cloud computing environment 1932, such as data management, synchronization, or long-duration data transfers.

Virtualized storage 1926-3 may include one or more storage systems and/or one or more devices that use virtualization techniques within the storage systems or devices of computing resource 1926a-d. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file-level and location where files are physically stored. This may enable optimization of storage use, server consolidation, and/or performance of non-disruptive file migrations.

Hypervisor 1926-4 may provide hardware virtualization techniques that allow multiple operations systems (e.g., "guest operating systems") to execute concurrently on a host computer, such as computing resource 1926a-d. Hypervisor 1926-4 may present a virtual operating platform to the guest operating systems and may manage the execution of the guest operating systems multiple instances of a variety of operating systems and may share virtualized hardware resources.

In an embodiment, the application 1942 may transmit a request to generate a form to the central system 1900. The form engine 1902 may render an initial screen on the graphical user interface (GUI) of the application 1942. The initial screen may include a batches tab and a templates tab.

The batches tab may be selected to render a batches screen. As shown in FIG. 2, the batches screen may include a list of batches that are in-progress and a list of batches that are completed. Batches may be data entered through generated forms that are to be processed.

The templates tab may be selected to navigate to the templates screen. As shown in FIG. 1, the templates screen may include a list of possible templates of generated forms. The templates may be forms previously generated by a user. The templates screen may include a button to create a new template (e.g., form).

In response to receiving a selection of the button to create a new template, form engine 1902 may render a templates info screen on the application 1942. As shown in FIG. 3, the templates info screen may include fields configured to receive a template name and description. The template name may be a mandatory field. The templates info screen may also include a select form fields button.

In response to receiving input for the template name and description and a selection of the select form fields button, form engine 1902 may render a form fields screen on the application 1942. As shown in FIG. 4, the form fields screen may include a section of a form including pre-generated form fields. The form fields may be input boxes, dropdowns, menu selections, or the like. Each section may be mapped to a given table in the data repository 1960. Each of the pre-generated form fields may be mapped to a given column in the data repository 1960. A visual indicator rendered may be rendered on the section to indicate that the section is currently selected. The visual indicator may be superimposed around the outline of the section.

The form fields screen may also include a selection of form fields divided-up by category. The selection of form fields may include buttons such as checkboxes adjacent to the selection of the form fields. The buttons may indicate whether the form fields are selected to be included in the form. The button may be toggled between unselected and selected by actuating the button.

The form fields screen may also include a selection to add a new section to the form. In response to receiving a selection for adding a new section to the form, a new section may be added to the form. As shown in FIG. 5, in response to the new section being generated, the visual indicator displayed on the section may be removed from the section and may be displayed in the new section. This indicates that the new section of the form is selected. The section or new section may be selected by providing some input in the respective section.

As shown in FIGS. 5-7, selection of a given section of the form may indicate where to add form fields when selected from the selection of form fields. For example, while the new section is selected, any unselected form field may be selected to be included in the new section. That is, while the new section is selected, a button corresponding to an unselected form field may be toggled from unselected to selected, in response to the actuation of the button corresponding to the selection of the form field. The form engine 1902 may retrieve the selected form field from form fields 1904 and add the selected form field in the new section of the form. Form fields 1904 may be a data repository storing pre-generated form fields. The form field may be pre-generated based on the type of form field. For example, the form field may include a label and may accept a specific type of input, such as date, alphanumeric text, a drop-down selection, or the like.

Each section may include a settings button and buttons corresponding to up and down arrows. The settings button may generate a pop-up for editing the settings for a given section. As shown in FIG. 8, the settings may include the section name, display defaults, and a delete section. The up and down arrow buttons may move the section up or down in the form.

As shown in FIGS. 4-7, in an embodiment, each of the form fields may be added to one section of the form field by toggling a button corresponding to the selection of the form field. Toggling a button from unselected to selected may generate a request to the form engine 1902 to add a form field to a given section. Toggling a button from selected to unselected may generate a request to the form engine 1902 to remove a form field from a given section.

The form engine 1902 may determine that the button corresponding to a selection of a form field which is included in the section has been actuated to toggle the button from selected to unselected, while the new section is selected. In response to this, the form engine 1902 may remove the form field from the section. The form engine 1902 may determine that the button corresponding to the same selection of the form field has been actuated to toggle the button from unselected to selected, while the new section is selected. In response to this, the form engine 1902 may retrieve the form field from form fields 1904 add the form field to the new section. In this regard, the form field may be removed from the section and added to the new section, while the new selection is selected, in response to first toggling the button corresponding to the form field from selected to unselected and then toggling the button from selected to unselected. That is, the form engine 1902 may add form fields to a given section when the given section is selected. However, the form engine 1902 may remove a form field from the given section, even when the given section is not selected. This is because, a form field may be added to a single section, so when the form engine 1902 receives a request to remove a form field the form engine 1902 may identify the section from to remove the form field based on where the form field was added in the first place. Alternatively, when receiving a request to add a form field, the form engine 1902 may need to determine where to add the form field. The form engine 1902 may identify which section to add the form field based on which section is selected.

Each of the form fields in the section or the new section may include up and down arrow buttons. In response to receiving a selection of these buttons, the form engine 1902 may move the form fields up and down within the section. Each of the form fields may also include a button to delete the form field from the section. Each of the form fields may also include a field label and an input field. The field label may indicate a type of form field. The input field may receive input when the form is generated by the form engine 1902. A default value may be provided for the input field of the form field. The form may render the default value when generated. The form field may also have an option to be made mandatory or required. In response to selecting the option for making a form field mandatory or required, the form may require input for the form field prior to submitting the form.

The form fields screen may include a next batch header button. In response to the selection of the next batch header button, the form engine 1902 may render the batch header screen on the application 1942. As shown in FIG. 10, a batch may be data to be retrieved from the forms in multiple instances. For example, a form may be configured to receive information about a single check. The batch may include 10 checks. This way, each form submission may correspond with a single check of the 10 required checks for the batch.

The batch header screen may include fields for configuring batch header fields. The batch header screen may include the field label and input field for the selected batch header fields. The batch header screen may also include a selection of batch header fields. The form engine 1902 may determine that a batch header field has been selected in response to the actuation of a button corresponding to the batch header field, to toggle the button from unselected to selected. The form engine 1902 may retrieve the pre-generated batch header field from form fields 1904, and render the field label and input field of the selected batch header field. The form engine 1902 may determine that a batch header field has been unselected in response to the actuation of a button corresponding to the selection of the batch header field, to toggle the button from selected to unselected. The form engine 1902 may remove the field label and input field from for unselected batch header field.

Each batch entry field may include arrow buttons and a delete button. The arrow buttons may move the batch entry field up and down. The delete button may be used to remove the batch entry field.

The batch header screen may include a save & close button. In response to receiving a selection of the save & close button, the form engine 1902 may generate the form based on the form fields included in the form and save the form in the form repository 1962. The templates screen in the initial screen may include the new form that was created.

The templates screen shown in FIG. 1 may also include an enter information button. The form engine 1902 may receive a selection of the button for selecting a form to submit from the application 1942. The form engine 1902 may render a template selection screen for selecting the form. As shown in FIG. 11, the template selection screen may include a dropdown menu including all the saved forms. The form engine 1902 may receive a selection from the dropdown menu and a selection of the next button on the template selection screen. The form engine 1902 may render input fields for batch header fields. These input fields may correspond with the batch header fields selected, as described above.

The form engine 1902 may render a set default values screen. As shown in FIG. 12, the set default values screen may allow a user to provide default values for particular form fields. These values provided as the default value for the form field for each instance of the form so the user does not have to re-enter the same information each time.

After receiving input for setting the default values, the form engine 1902 may receive a selection of a save button. The form engine 1902 may save the default values and render the form on the application 1942. As shown in FIG. 14, the form may include the selected sections and form fields, as described above.

The form engine 1902 may receive inputs for each of the form fields on the form and a selection to save and fill out a new instance of the form. A summary including information about the saved form may be rendered below the new instance of the form. Each instance of the form that is filled out and saved may be added to the summary.

The form may also include a cancel & clear form button. In response to receiving a selection of the cancel & clear form button, the form engine 1902 may clear the inputs on the form.

When all of the instances of the form have been filled out and saved, the form engine 1902 may receive a selection for a button for executing a batch dry run. In response to this, the form engine 1902 may process all the data in each instance of the forms, to check for any errors. The form engine 1902 may receive a selection of a button for processing a batch. The form engine 1902 may process all the data in each instance of the forms. Processing the data may include, committing the data in the respective data repositories (e.g., data repository 1960) or executing any actions triggered by the data. For example, form engine 1902 may save the inputs for each instance of the forms in the data repository 1960 and render a new instance of the form.

As described above, each section may be mapped to a given table of the data repository 1960 and each form field may be mapped to a given column in the data repository 1960. In response to processing an instance of a form, the values of the form fields may be stored in the columns corresponding to the form fields. The columns may be in a table corresponding to the section associated with the respective form fields. As a non-limiting example, a form may include section 1 and section 2. Section 1 may include form field 1 and form field 2 and section 2 may include form field 3 and form field 4. In response to processing the form, the form engine 1902 may store the values provided for form field 1 and form field 2 in columns corresponding to form field 1 and form field 2, which are located in a table corresponding to section 1. The form engine 1902 may store the values provided for form field 3 and form field 4 in columns corresponding to form field 3 and form field 4, which are located in a table corresponding to section 2.

The sections and form fields of a form may be embodied as data objects such as an instance of a class. The objects may have a hierarchical structure. For example, a parent object corresponding to the section of the form may be associated with child objects corresponding to form fields belonging to the section. As a non-limiting example, the sections of the forms may correspond with APEX classes populated with objects such as form fields. In response to saving the generated form, the objects corresponding to the sections and form fields of the form may be serialized into an object or JavaScript Object Notation (JSON) structure. As an example, the object may be a representation of data that has or will be persisted. The object or JSON structure may be saved in the forms data repository 1962.

Figure 20:
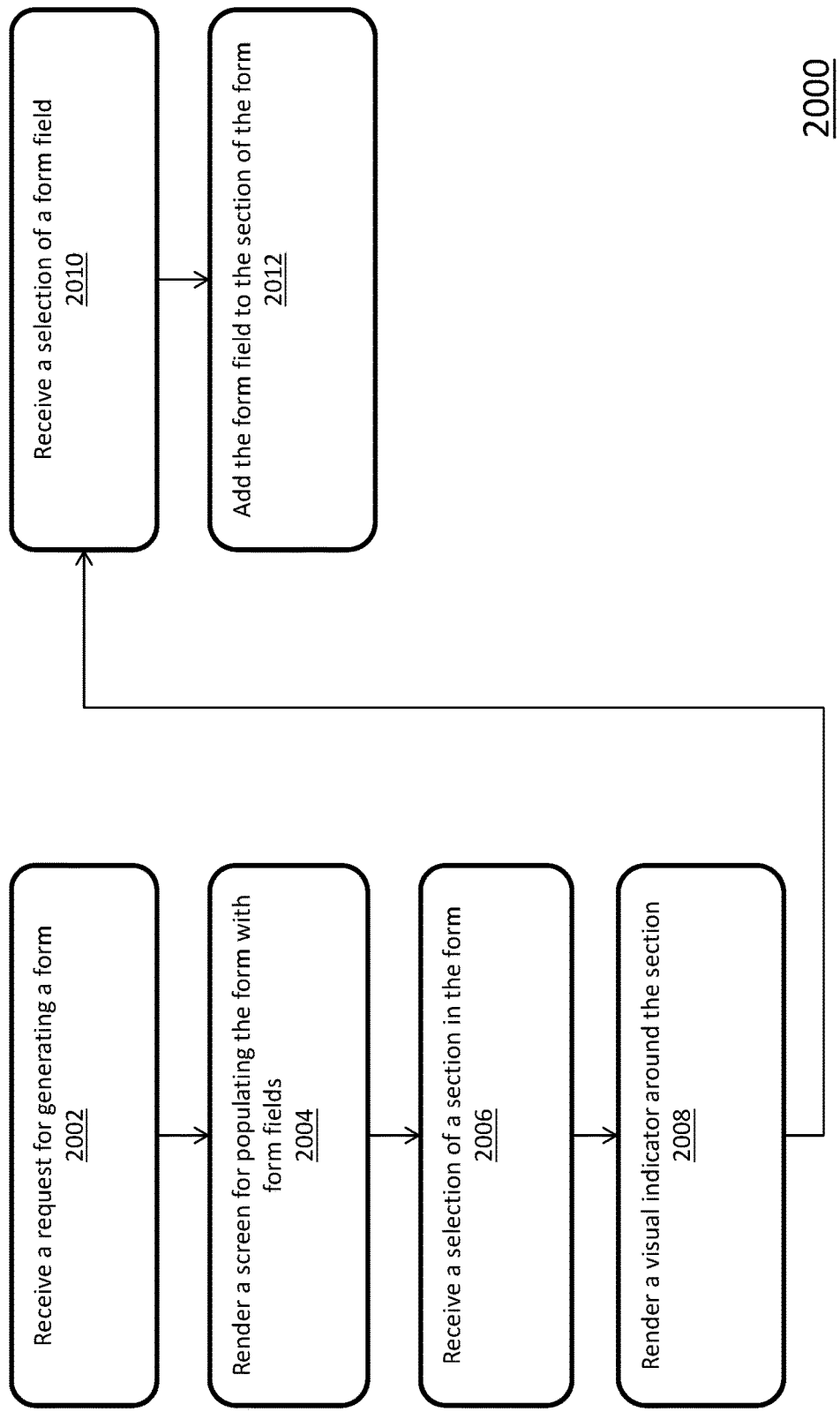
FIG. 20 is a flowchart illustrating the process for seamless adding and removing form fields from a form according to an example embodiment.

FIG. 20 is a flowchart illustrating a process 2000 for seamless adding and removing form fields from a form according to an example embodiment. It is to be appreciated the operations may occur in a different order, and some operations may not be performed.

In operation 2002, a form engine may receive a request for generating a form (or a template for a form) from a user device. The form may be associated with a batch to be processed. As a non-limiting example, the form to be generated may be used for collecting information about donations received for a given charity. Each instance of the form may be collect information about a single donation. The batch may include each of the instances of the form expected to be submitted.

In operation 2004, the form engine may render a screen for populating the form with form fields. The form fields may be organized in the form based on particular sections. The form fields may be pre-generated form fields configured to receive a particular type of data based on the type of form field. Each of the form fields may be mapped to a given column in a data repository, so that when the form is processed, the value provided for a given form field may be stored in the given column of the data repository.

In operation 2006, the form engine may receive a selection of a section in the form.

In operation 2008, the form engine may render a visual indicator around the section. The visual indicator may be rendered around the outline of the section. The visual indicator indicates that the section is selected.

In operation 2010, the form engine may receive a selection of a form field. The form field may be selected based on the actuation of a button corresponding to form field, causing the button to toggle from unselected to selected.

In operation 2012, the form engine may add the form field to the section of the form, in response to the selection of the form field and based on the section being selected.

Figure 21:
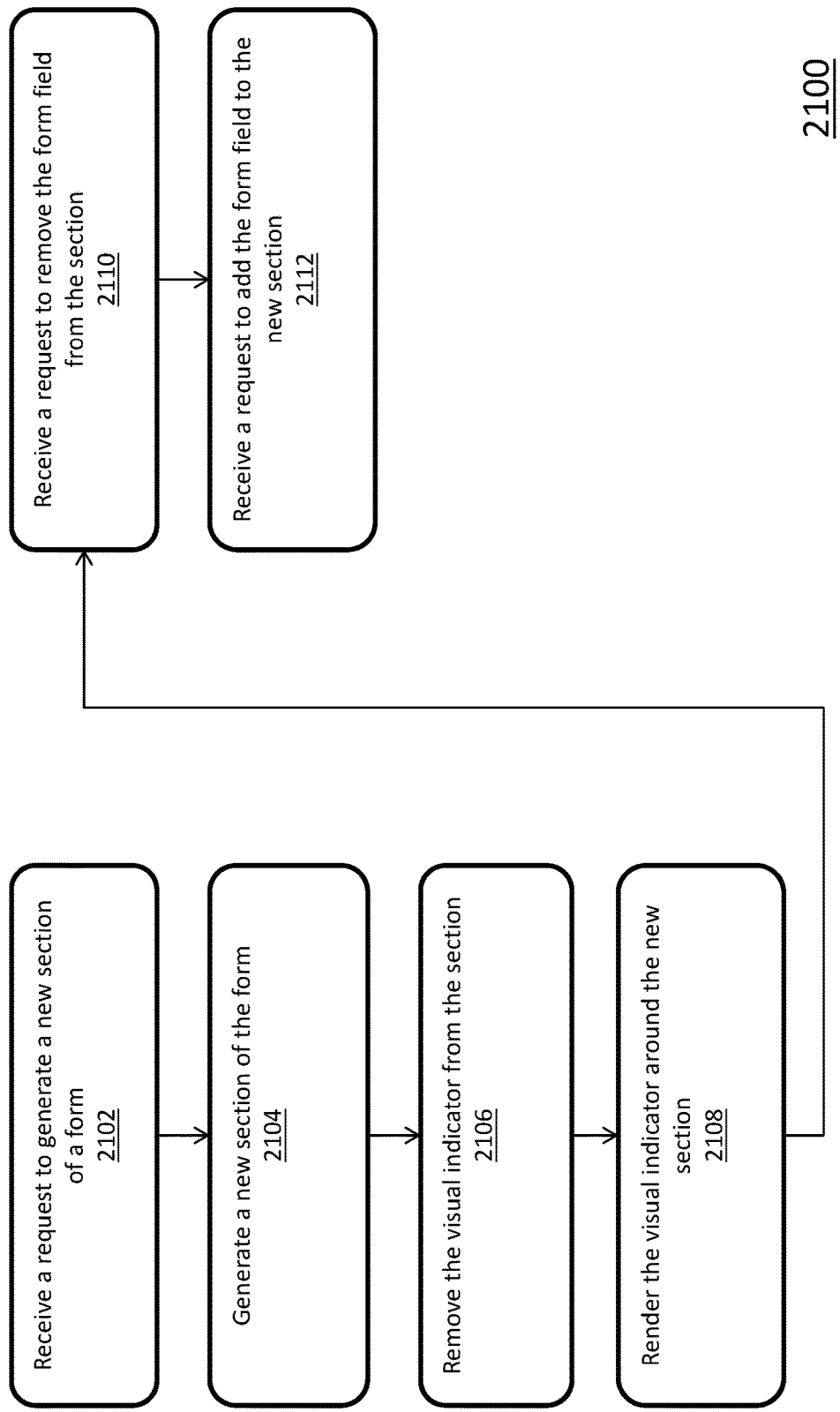
FIG. 21 is a flowchart illustrating the process for seamless adding and removing form fields from a form according to an example embodiment.

FIG. 21 is a flowchart illustrating a process 2100 for seamless adding and removing form fields from a form according to an example embodiment. It is to be appreciated the operations may occur in a different order, and some operations may not be performed.

In operation 2102, a form engine may receive a request to generate a new section of a form, in a form being generated. The form may include a section that may include a form field. A visual indicator may be rendered around the section, indicating that the section is selected.

In operation 2104, the form engine may generate a new section of the form. The form may now include the section and the new section. The names and other settings of the sections may be customized by the user.

In operation 2106, upon generation of the new section, the form engine may remove the visual indicator from the section. This indicates that the section is no longer selected.

In operation 2108, the form engine may render the visual indicator around the new section, indicating that the new section is selected. The section or new section may be selected by providing some input in the respective section.

In operation 2110, the form engine may receive a request to remove the form field from the section in response to the actuation of the button corresponding to the form field, causing the button to toggle from selected to unselected. The form field may be removed from the section.

In operation 2112 the form engine may receive a request to add the form field (i.e., the same form field removed from the section) to the new section in response to in response actuation of the button corresponding to the form field, causing the button to toggle from unselected to selected. The form field may be added to the new section based on the new section being selected.

Figure 22:
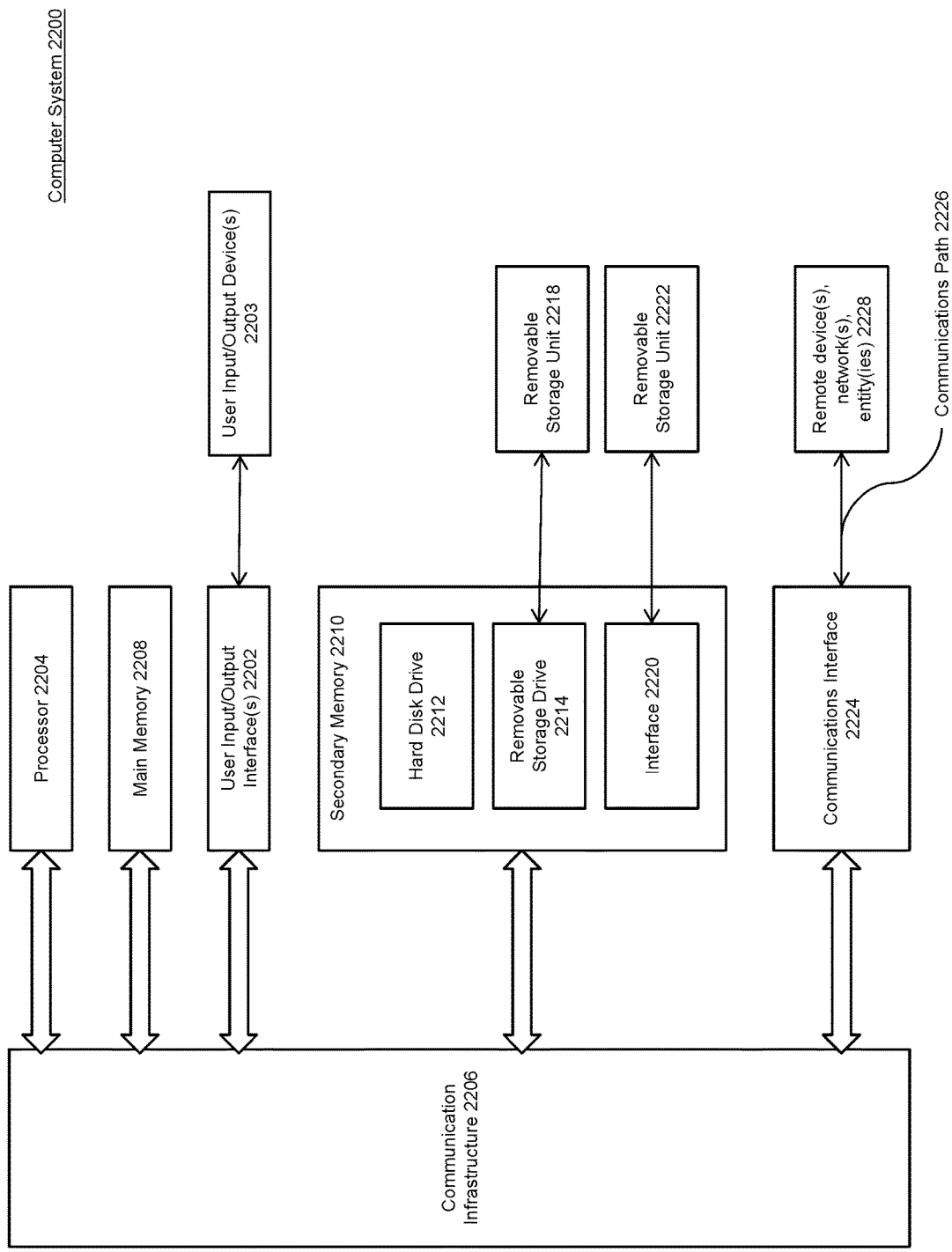
FIG. 22 is a block diagram of example components of a computing system according to an embodiment.

FIG. 22 is a block diagram of example components of device 2200. One or more computer systems 2200 may be used, for example, to implement any of the embodiments discussed herein, as well as combinations and sub-combinations thereof. Computer system 2200 may include one or more processors (also called central processing units, or CPUs), such as a processor 2204. Processor 2204 may be connected to a communication infrastructure or bus 2206.

Computer system 2200 may also include user input/output device(s) 2203, such as monitors, keyboards, pointing devices, etc., which may communicate with communication infrastructure 2206 through user input/output interface(s) 2202.

One or more of processors 2204 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 2200 may also include a main or primary memory 308, such as random access memory (RAM). Main memory 2208 may include one or more levels of cache. Main memory 308 may have stored therein control logic (i.e., computer software) and/or data.

Computer system 2200 may also include one or more secondary storage devices or memory 2210. Secondary memory 2210 may include, for example, a hard disk drive 2212 and/or a removable storage device or drive 2214.

Removable storage drive 2214 may interact with a removable storage unit 2218. Removable storage unit 2218 may include a computer-usable or readable storage device having stored thereon computer software (control logic) and/or data. Removable storage unit 2218 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 2214 may read from and/or write to removable storage unit 2218.

Secondary memory 2210 may include other means, devices, components, instrumentalities or other approaches for allowing computer programs and/or other instructions and/or data to be accessed by computer system 2200. Such means, devices, components, instrumentalities or other approaches may include, for example, a removable storage unit 2222 and an interface 2220. Examples of the removable storage unit 2222 and the interface 2220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 2200 may further include a communication or network interface 2224. Communication interface 2224 may enable computer system 2200 to communicate and interact with any combination of external devices, external networks, external entities, etc. (individually and collectively referenced by reference number 2228). For example, communication interface 2224 may allow computer system 2200 to communicate with external or remote devices 2228 over communications path 2226, which may be wired and/or wireless (or a combination thereof), and which may include any combination of LANs, WANs, the Internet, etc. Control logic and/or data may be transmitted to and from computer system 2200 via communication path 2226.

Computer system 2200 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

Computer system 2200 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 2200 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 2200, main memory 2208, secondary memory 2210, and removable storage units 2218 and 2222, as well as tangible articles of manufacture embodying any combination of the foregoing. Such control logic, when executed by one or more data processing devices (such as computer system 2200), may cause such data processing devices to operate as described herein.

The breadth and scope of the present disclosure should not be limited by any of the above-described exemplary embodiments but should be defined only in accordance with the following claims and their equivalents.

What is claimed is:

1. A computer-implemented method comprising:
   rendering, by one or more computing devices, a visual indicator around an existing section of a form in response to receiving a selection of the existing section from a plurality of existing sections of the form, the existing section comprising a plurality of form fields, wherein the visual indicator indicates that the existing section is selected, wherein a first predetermined one or more of the plurality of form fields are rendered with default values, and wherein a second predetermined one or more of the plurality of form fields have a characteristic of not configurable to accept a default value; and
   adding, by the one or more computing devices, a pre-generated form field to the existing section of the form in response to selection of a button corresponding to the form field and based on the existing section being selected,
   wherein:
      the pre-generated form field includes a mapping to a column of a data repository and is configured to receive a particular data type,
      the pre-generated form field added to the existing section of the form comprises a first plurality of arrow buttons configured to move the added pre-generated form field among the plurality of form fields within the existing section, and
      the first plurality of arrow buttons move with the pre-generated form field within the existing section of the form.

2. The method of claim 1, further comprising toggling, by the one or more computing devices, the button corresponding to the form field in response to the button being selected, wherein the button is toggled between selected and unselected.

3. The method of claim 1, further comprising:
   receiving, by the one or more computing devices, a request to generate a new section of the form;

generating, by the one or more computing devices, the new section of the form;

removing, by the one or more computing devices, the visual indicator from around the existing section of the form; and rendering, by the one or more computing devices, the visual indicator around the new section of the form, indicating that the new section is selected.

4. The method of claim 3, further comprising:

removing, by the one or more computing devices and while the visual indicator is around the new section, the form field from the existing section in response to actuation of the button corresponding to the form field, causing the button to toggle from selected to unselected; and adding, by the one or more computing devices and while the visual indicator is around the new section, the form field to the new section, in response to actuation of the button corresponding to the form field, causing the button to toggle from unselected to selected.

5. The method of claim 1, wherein the added pre-generated form field further comprises a required button, wherein selection of the required button displays an asterisk next to the button corresponding to the form field, and wherein the button corresponding to the form field is external to the form.

6. The method of claim 1, further comprising generating, by the one or more computing devices, the form including the existing section, wherein the form is configured to receive batch inputs to be committed to the data repository.

7. The method of claim 1, wherein the form comprises a plurality of sections, and wherein the existing section comprises a second plurality of arrow buttons configured to move the existing section among the plurality of sections in the form.

8. A system comprising:

a memory;

a processor coupled to a memory, the processor configured to:

render a visual indicator around an existing section of a form, wherein the visual indicator indicates that the existing section is selected in response to receiving a selection of the existing section from a plurality of existing sections of the form, the existing section comprising a plurality of form fields, wherein a first predetermined one or more of the plurality of form fields are rendered with default values, and wherein a second predetermined one or more of the plurality of form fields have a characteristic of not configurable to accept a default value; and add a pre-generated form field to the existing section of the form in response to selection of a button corresponding to the form field and based on the existing section being selected, wherein:

the pre-generated form field includes a mapping to a column of a data repository and is configured to receive a particular data type, the pre-generated form field added to the existing section of the form comprises a first plurality of arrow buttons configured to move the added pre-generated form field among the plurality of form fields within the existing section, and the first plurality of arrow buttons move with the pre-generated form field within the existing section of the form.

9. The system of claim 8, wherein the processor is further configured to toggle the button corresponding to the form field in response to the button being selected, wherein the button is toggled between selected and unselected.

10. The system of claim 8, wherein the processor is further configured to:

receive a request to generate a new section of the form;

generate the new section of the form;

remove the visual indicator from around the existing section of the form; and render the visual indicator around the new section of the form, indicating that the new section is selected.

11. The system of claim 10, wherein the processor is further configured to:

remove, while the visual indicator is around the new section, the form field from the existing section in response to actuation of the button corresponding to the form field, causing the button to toggle from selected to unselected; and add, while the visual indictor is around the new section, the form field to the new section, in response to actuation of the button corresponding to the form field, causing the button to toggle from unselected to selected.

12. The system of claim 8, wherein the added pre-generated form field further comprises a required button, wherein selection of the required button displays an asterisk next to the button corresponding to the form field, and wherein the button corresponding to the form field is external to the form.

13. The system of claim 8, wherein the processor is further configured to generate the form including the existing section, and wherein the form is configured to receive batch inputs to be committed to the data repository.

14. The system of claim 8, wherein the form comprises a plurality of sections, and wherein the existing section comprises a second plurality of arrow buttons configured to move the existing section among the plurality of sections in the form.

15. A non-transitory computer-readable medium storing instructions that when executed by one or more processors of a device cause the one or more processors to:

render a visual indicator around an existing section of a form, wherein the visual indicator indicates that the existing section is selected in response to receiving a selection of the existing section from a plurality of existing sections of the form, the existing section comprising a plurality of form fields, wherein a first predetermined one or more of the plurality of form fields are rendered with default values, and wherein a second predetermined one or more of the plurality of form fields have a characteristic of not configurable to accept a default value; and add a pre-generated form field to the existing section of the form in response to selection of a button corresponding to the form field and based on the existing section being selected, wherein:

the pre-generated form field includes a mapping to a column of a data repository and is configured to receive a particular data type, the pre-generated form field added to the existing section of the form comprises a first plurality of arrow buttons configured to move the added pre-generated form field among the plurality of form fields within the existing section, and the first plurality of arrow buttons move with the pre-generated form field within the existing section of the form.

16. The non-transitory computer-readable medium of claim 15, wherein the instructions when executed by the one or more processors, cause the one or more processors to toggle the button corresponding to the form field in response to the button being selected, and wherein the button is toggled between selected and unselected.

17. The non-transitory computer-readable medium of claim 15, wherein the instructions, when executed by the one or more processors, cause the one or more processors to:
receive a request to generate a new section of the form;
generate the new section of the form;
remove the visual indicator from around the existing section of the form; and
render the visual indicator around the new section of the form, indicating that the new section is selected.

18. The non-transitory computer-readable medium of claim 17, wherein the instructions, when executed by the one or more processors, cause the one or more processors to:
remove, while the visual indicator is around the new section, the form field from the existing section in response to actuation of the button corresponding to the form field, causing the button to toggle from selected to unselected; and
add, while the visual indicator is around the new section, the form field to the new section, in response to actuation of the button corresponding to the form field, causing the button to toggle from unselected to selected.

19. The non-transitory computer-readable medium of claim 15, wherein the processor is further configured to generate the form including the existing section, and wherein the form is configured to receive batch inputs to be committed to the data repository.

20. The non-transitory computer-readable medium of claim 15, wherein the form comprises a plurality of sections, and wherein the existing section comprises a second plurality of arrow buttons configured to move the existing section among the plurality of sections in the form.

* * * * *

UNITED STATES PATENT AND TRADEMARK OFFICE
CERTIFICATE OF CORRECTION

Page 1 of 1

PATENT NO. : 11,875,110 B2
APPLICATION NO. : 16/778565
DATED : January 16, 2024
INVENTOR(S) : Martinov et al.

It is certified that error appears in the above-identified patent and that said Letters Patent is hereby corrected as shown below:

In the Drawings

On Sheet 4 of 22, FIG. 4, Tag 402, Line 6, delete "Acount" and insert -- Account --, therefor.

On Sheet 5 of 22, FIG. 5, Tag 402, Line 6, delete "Acount" and insert -- Account --, therefor.

On Sheet 6 of 22, FIG. 6, Tag 402, Line 6, delete "Acount" and insert -- Account --, therefor.

On Sheet 7 of 22, FIG. 7, Tag 402, Line 6, delete "Acount" and insert -- Account --, therefor.

In the Claims

In Column 20, Claim 15, Line 41, delete "device" and insert -- device, --, therefor.

Signed and Sealed this
Thirtieth Day of July, 2024

Katherine Kelly Vidal
*Director of the United States Patent and Trademark Office*